(12) United States Patent
Russ et al.

(10) Patent No.: US 7,861,272 B2
(45) Date of Patent: Dec. 28, 2010

(54) NETWORKED SUBSCRIBER TELEVISION DISTRIBUTION

(76) Inventors: Samuel H. Russ, 1510 Cumberland Ct., Alpharetta, GA (US) 30004; David B. Lett, 1987 Misty Woods Dr., Duluth, GA (US) 30097; Jonathan A. Robinson, 5384 Monarch Pine La., Norcross, GA (US) 30071; Michael A. Gaul, 652 Brass Key Ct., Lawrenceville, GA (US) 30045

( * ) Notice: Subject to any disclaimer, the term of this patent is extended or adjusted under 35 U.S.C. 154(b) by 1491 days.

(21) Appl. No.: 10/008,581

(22) Filed: Nov. 13, 2001

(65) Prior Publication Data

US 2002/0059642 A1     May 16, 2002

Related U.S. Application Data

(60) Provisional application No. 60/248,485, filed on Nov. 14, 2000.

(51) Int. Cl.
*H04N 7/18* (2006.01)
*H04N 7/173* (2006.01)
*H04N 7/16* (2006.01)

(52) U.S. Cl. .................. 725/74; 725/78; 725/80; 725/131; 725/133; 725/139; 725/141; 725/151; 725/153

(58) Field of Classification Search ............ 725/58, 725/74, 78, 80, 131, 133, 139, 141, 151, 725/153
See application file for complete search history.

(56) References Cited

U.S. PATENT DOCUMENTS

| | | | |
|---|---|---|---|
| 4,215,366 A * | 7/1980 | Davidson | 380/235 |
| 4,290,081 A | 9/1981 | Foerster | 358/4 |
| 4,439,784 A | 3/1984 | Furukawa et al. | |
| 4,535,355 A | 8/1985 | Arn et al. | |
| 4,540,958 A | 9/1985 | Neyens et al. | 332/16 |
| 4,578,533 A | 3/1986 | Pierce | |
| 4,644,526 A | 2/1987 | Wu | 370/295 |
| 4,686,564 A | 8/1987 | Masuko et al. | |
| 4,706,121 A | 11/1987 | Young | |
| 4,751,578 A | 6/1988 | Reiter et al. | |
| 4,885,803 A | 12/1989 | Hermann et al. | |
| 4,908,713 A | 3/1990 | Levine | |
| 4,916,532 A * | 4/1990 | Streck et al. | 348/723 |
| 4,963,994 A | 10/1990 | Levine | |
| 4,963,995 A | 10/1990 | Lang | |

(Continued)

FOREIGN PATENT DOCUMENTS

EP      0912054      4/1999

(Continued)

OTHER PUBLICATIONS

Scientific-Atlanta, Inc. Pending U.S. Appl. No. 10/008,581, filed Nov. 13, 2001, entitled "Networked Subscriber Television Distribution," Inventors: Samuel H. Russ, David B. Lett, Jonathan A. Robinson, and Michael A. Gaul.

(Continued)

*Primary Examiner*—Son P Huynh
(74) *Attorney, Agent, or Firm*—Merchant & Gould

(57) ABSTRACT

A master device interactively distributes a television signal to a remote device for remote display with low latency between a user input and a television signal change.

56 Claims, 10 Drawing Sheets

U.S. PATENT DOCUMENTS

| | | | |
|---|---|---|---|
| 5,010,299 A | 4/1991 | Nishizawa et al. | |
| 5,010,399 A | 4/1991 | Goodman et al. | 358/85 |
| 5,038,211 A | 8/1991 | Hallenbeck | |
| 5,048,054 A | 9/1991 | Eyuboglu et al. | |
| 5,155,591 A | 10/1992 | Wachob | 725/35 |
| 5,168,372 A | 12/1992 | Sweetser | 725/29 |
| 5,251,074 A | 10/1993 | Hamma et al. | 360/10.1 |
| 5,253,066 A | 10/1993 | Vogel | |
| 5,293,357 A | 3/1994 | Hallenbeck | |
| 5,381,449 A | 1/1995 | Jasper et al. | |
| 5,406,626 A | 4/1995 | Ryan | 380/9 |
| 5,412,416 A | 5/1995 | Nemirofsky | |
| 5,479,268 A | 12/1995 | Young et al. | |
| 5,481,542 A | 1/1996 | Logston et al. | |
| 5,508,815 A | 4/1996 | Levine | |
| 5,515,377 A * | 5/1996 | Horne et al. | 370/395.64 |
| 5,524,051 A | 6/1996 | Ryan | 380/9 |
| 5,553,211 A | 9/1996 | Uotani | |
| 5,568,272 A | 10/1996 | Levine | |
| 5,574,964 A | 11/1996 | Hamlin | |
| 5,579,308 A | 11/1996 | Humpleman | |
| 5,590,195 A | 12/1996 | Ryan | 380/9 |
| 5,600,364 A | 2/1997 | Hendricks et al. | |
| 5,600,573 A | 2/1997 | Hendricks et al. | |
| 5,600,707 A | 2/1997 | Miller, II | |
| 5,621,793 A | 4/1997 | Bednarek et al. | |
| 5,636,247 A | 6/1997 | Kamerman et al. | |
| 5,638,423 A | 6/1997 | Grube et al. | |
| 5,642,384 A | 6/1997 | Ramesh | |
| 5,652,772 A | 7/1997 | Isaksson et al. | |
| 5,657,072 A | 8/1997 | Aristides et al. | |
| 5,666,151 A | 9/1997 | Kondo et al. | |
| 5,682,206 A | 10/1997 | Wehmeyer et al. | |
| 5,699,105 A | 12/1997 | Chen et al. | |
| 5,701,383 A | 12/1997 | Russo et al. | 386/46 |
| 5,708,961 A | 1/1998 | Hylton et al. | 455/4.2 |
| 5,714,945 A | 2/1998 | Sakuma et al. | |
| 5,715,020 A | 2/1998 | Kuroiwa et al. | |
| 5,715,277 A | 2/1998 | Goodson et al. | |
| 5,732,359 A | 3/1998 | Baranowsky et al. | |
| 5,734,437 A | 3/1998 | Back | |
| 5,751,806 A | 5/1998 | Ryan | 380/9 |
| 5,758,257 A | 5/1998 | Herz et al. | |
| 5,774,527 A | 6/1998 | Handelman et al. | |
| 5,778,181 A | 7/1998 | Hidary et al. | |
| 5,787,472 A | 7/1998 | Dan et al. | 711/134 |
| 5,793,413 A * | 8/1998 | Hylton et al. | 725/81 |
| 5,793,414 A | 8/1998 | Shaffer | |
| 5,796,442 A * | 8/1998 | Gove et al. | 348/556 |
| 5,801,787 A | 9/1998 | Schein et al. | |
| 5,805,763 A | 9/1998 | Lawler et al. | |
| 5,808,659 A | 9/1998 | Coutinho et al. | |
| 5,809,204 A | 9/1998 | Young et al. | |
| 5,815,794 A | 9/1998 | Williams | |
| 5,828,403 A | 10/1998 | DeRodeff et al. | 348/7 |
| 5,835,128 A | 11/1998 | Macdonald et al. | |
| 5,835,602 A | 11/1998 | Lang | |
| 5,838,873 A | 11/1998 | Blatter et al. | 386/95 |
| 5,850,218 A | 12/1998 | LaJoie et al. | |
| 5,850,340 A | 12/1998 | Rakib et al. | 725/120 |
| 5,851,149 A | 12/1998 | Xidos et al. | |
| 5,867,485 A | 2/1999 | Chambers et al. | 370/281 |
| 5,872,644 A | 2/1999 | Yamazaki et al. | |
| 5,883,677 A | 3/1999 | Hofmann | 348/584 |
| 5,886,732 A | 3/1999 | Humpleman | 348/10 |
| 5,886,753 A | 3/1999 | Shinyagaito et al. | |
| 5,915,068 A | 6/1999 | Levine | |
| 5,920,801 A | 7/1999 | Thomas et al. | 455/3.1 |
| 5,930,247 A | 7/1999 | Miller, II et al. | 370/338 |
| 5,936,660 A | 8/1999 | Gurantz | |
| 5,940,073 A | 8/1999 | Klosterman et al. | |
| 5,940,387 A | 8/1999 | Humpleman | |
| 5,970,053 A | 10/1999 | Schick et al. | |
| 5,970,386 A * | 10/1999 | Williams | 725/69 |
| 5,983,068 A | 11/1999 | Tomich et al. | |
| 5,990,927 A | 11/1999 | Hendricks et al. | |
| 5,995,258 A | 11/1999 | Weber et al. | |
| 5,999,622 A | 12/1999 | Yasukawa et al. | 705/51 |
| 6,005,861 A | 12/1999 | Humpleman | |
| 6,005,876 A | 12/1999 | Cimini, Jr. et al. | |
| 6,006,257 A | 12/1999 | Slezak | |
| 6,014,546 A | 1/2000 | Georges et al. | |
| 6,018,768 A | 1/2000 | Ullman et al. | |
| 6,023,603 A | 2/2000 | Matsubara | 455/3.2 |
| 6,026,150 A | 2/2000 | Frank | |
| 6,037,998 A | 3/2000 | Usui et al. | |
| 6,052,556 A | 4/2000 | Sampsell | |
| 6,055,355 A | 4/2000 | Lee | 386/70 |
| 6,061,449 A | 5/2000 | Candelore et al. | |
| 6,069,621 A | 5/2000 | Schupak | 715/717 |
| 6,073,122 A | 6/2000 | Wool | |
| 6,091,320 A | 7/2000 | Odinak | 340/310.01 |
| 6,091,767 A * | 7/2000 | Westerman | 375/240 |
| 6,100,883 A | 8/2000 | Hoarty | |
| 6,100,936 A | 8/2000 | Jordan et al. | |
| 6,115,456 A | 9/2000 | Nolde | 379/102.01 |
| 6,118,873 A | 9/2000 | Lotspiech et al. | |
| 6,119,154 A * | 9/2000 | Weaver et al. | 709/219 |
| 6,122,482 A | 9/2000 | Green, Sr. et al. | 455/3.2 |
| 6,125,103 A | 9/2000 | Baumi et al. | |
| 6,133,912 A | 10/2000 | Montero | 715/716 |
| 6,151,493 A | 11/2000 | Sasakura et al. | |
| 6,166,744 A | 12/2000 | Jaszlics et al. | |
| 6,169,543 B1 | 1/2001 | Wehmeyer | |
| 6,172,712 B1 | 1/2001 | Beard | 348/552 |
| 6,175,343 B1 | 1/2001 | Mitchell et al. | |
| 6,175,551 B1 | 1/2001 | Awater et al. | |
| 6,177,931 B1 | 1/2001 | Alexander et al. | |
| 6,177,963 B1 | 1/2001 | Foye et al. | |
| 6,181,784 B1 | 1/2001 | Duran et al. | 379/93.21 |
| 6,182,287 B1 | 1/2001 | Schneidewend et al. | |
| 6,188,700 B1 * | 2/2001 | Kato et al. | 370/477 |
| 6,202,211 B1 | 3/2001 | Williams, Jr. | |
| 6,208,669 B1 | 3/2001 | Cimini, Jr. et al. | |
| 6,215,526 B1 | 4/2001 | Barton et al. | 348/473 |
| 6,219,839 B1 | 4/2001 | Sampsell | |
| 6,229,895 B1 | 5/2001 | Son et al. | |
| 6,230,162 B1 * | 5/2001 | Kumar et al. | 707/104.1 |
| 6,233,389 B1 | 5/2001 | Barton et al. | 386/46 |
| 6,236,653 B1 | 5/2001 | Dalton et al. | |
| 6,240,555 B1 | 5/2001 | Shoff et al. | |
| 6,299,895 B1 | 5/2001 | Son et al. | |
| 6,243,142 B1 | 6/2001 | Mugura et al. | |
| 6,263,503 B1 * | 7/2001 | Margulis | 725/81 |
| 6,285,746 B1 | 9/2001 | Duran et al. | 379/93.21 |
| 6,286,140 B1 | 9/2001 | Ivanyi | |
| 6,286,142 B1 | 9/2001 | Ehreth | |
| 6,305,017 B1 | 10/2001 | Satterfield | |
| 6,310,886 B1 | 10/2001 | Barton | 370/462 |
| 6,314,146 B1 | 11/2001 | Tellado et al. | |
| 6,317,884 B1 * | 11/2001 | Eames et al. | 709/217 |
| 6,324,338 B1 | 11/2001 | Wood et al. | 386/83 |
| 6,327,418 B1 | 12/2001 | Barton | 386/46 |
| 6,330,334 B1 | 12/2001 | Ryan | 380/237 |
| 6,333,937 B1 | 12/2001 | Ryan | |
| 6,353,929 B1 | 3/2002 | Houston | |
| 6,356,309 B1 * | 3/2002 | Masaki et al. | 348/439.1 |
| 6,377,782 B1 | 4/2002 | Bishop et al. | 455/3.01 |
| 6,378,130 B1 | 4/2002 | Adams | 725/95 |
| 6,411,820 B1 | 6/2002 | Margarit et al. | |
| 6,415,031 B1 | 7/2002 | Colligan et al. | |
| 6,418,558 B1 | 7/2002 | Roberts et al. | |
| 6,421,706 B1 * | 7/2002 | McNeill et al. | 709/204 |
| 6,424,947 B1 | 7/2002 | Tsuria et al. | |

| | | |
|---|---|---|
| 6,438,165 B2 * | 8/2002 | Normile .................... 375/240 |
| 6,441,832 B1 | 8/2002 | Tao et al. |
| 6,442,755 B1 | 8/2002 | Lemmons et al. |
| 6,452,923 B1 | 9/2002 | Gerszberg et al. |
| 6,459,427 B1 | 10/2002 | Mao et al. .................. 725/109 |
| 6,473,559 B1 | 10/2002 | Knudson et al. |
| 6,481,013 B1 | 11/2002 | Dinwiddie et al. |
| 6,483,548 B1 | 11/2002 | Allport |
| 6,493,875 B1 | 12/2002 | Eames et al. |
| 6,496,980 B1 * | 12/2002 | Tillman et al. ................ 725/90 |
| 6,505,348 B1 * | 1/2003 | Knowles et al. .............. 725/49 |
| 6,516,029 B1 | 2/2003 | Wang |
| 6,526,581 B1 | 2/2003 | Edson ......................... 725/74 |
| 6,530,085 B1 | 3/2003 | Perlman |
| 6,535,717 B1 * | 3/2003 | Matsushima et al. .......... 455/18 |
| 6,536,041 B1 | 3/2003 | Knudson et al. |
| 6,542,610 B2 | 4/2003 | Traw et al. |
| 6,556,557 B1 | 4/2003 | Cimini, Jr. et al. |
| 6,567,981 B1 | 5/2003 | Jeffrey |
| 6,578,070 B1 * | 6/2003 | Weaver et al. ............... 709/206 |
| 6,588,017 B1 * | 7/2003 | Calderone ................... 725/120 |
| 6,594,798 B1 * | 7/2003 | Chou et al. ................. 714/820 |
| 6,614,936 B1 * | 9/2003 | Wu et al. .................... 382/238 |
| 6,622,304 B1 | 9/2003 | Carhart |
| 6,622,307 B1 * | 9/2003 | Ho ............................. 725/120 |
| 6,631,522 B1 * | 10/2003 | Erdelyi ....................... 725/53 |
| 6,637,031 B1 * | 10/2003 | Chou .......................... 725/87 |
| 6,675,385 B1 | 1/2004 | Wang ......................... 725/39 |
| 6,681,326 B2 | 1/2004 | Son et al. |
| 6,697,426 B1 * | 2/2004 | Van Der Schaar et al. ......................... 375/240.01 |
| 6,697,489 B1 | 2/2004 | Candelore |
| 6,704,028 B2 | 3/2004 | Wugofski |
| 6,711,132 B2 | 3/2004 | Lazarus |
| 6,735,221 B1 | 5/2004 | Cherubini |
| 6,735,312 B1 | 5/2004 | Abdalla et al. |
| 6,754,905 B2 | 6/2004 | Gordon et al. |
| 6,757,906 B1 | 6/2004 | Look et al. |
| 6,766,526 B1 | 7/2004 | Ellis |
| 6,769,127 B1 * | 7/2004 | Bonomi et al. ................ 725/39 |
| 6,771,908 B2 | 8/2004 | Eijk et al. |
| 6,785,258 B1 | 8/2004 | Garcia, Jr. et al. |
| 6,785,901 B1 | 8/2004 | Horiwitz et al. ............... 725/25 |
| 6,788,740 B1 * | 9/2004 | van der Schaar et al. .... 375/240 |
| 6,789,106 B2 | 9/2004 | Eyer et al. |
| 6,791,995 B1 | 9/2004 | Azenkot et al. |
| 6,795,205 B1 | 9/2004 | Gacek |
| 6,798,838 B1 * | 9/2004 | Ngo ....................... 375/240.19 |
| 6,804,357 B1 | 10/2004 | Ikonen et al. |
| 6,816,194 B2 * | 11/2004 | Zhang et al. ........... 375/240.27 |
| 6,816,904 B1 | 11/2004 | Ludwig et al. ............... 709/226 |
| 6,845,486 B2 | 1/2005 | Yamada et al. |
| 6,864,778 B2 | 3/2005 | Musschebroeck et al. |
| 6,868,292 B2 | 3/2005 | Ficco et al. |
| 6,870,570 B1 | 3/2005 | Bowser |
| 6,889,385 B1 * | 5/2005 | Rakib et al. ................. 725/119 |
| 6,904,522 B1 | 6/2005 | Benardeau et al. |
| 6,915,529 B1 | 7/2005 | Suematsu et al. |
| 6,922,843 B1 | 7/2005 | Herrington et al. ............ 725/30 |
| 6,930,788 B1 | 8/2005 | Iwamoto et al. |
| 6,941,515 B1 | 9/2005 | Wilkins |
| 6,954,897 B1 | 10/2005 | Noguchi et al. |
| 6,957,344 B1 | 10/2005 | Goldshlag et al. |
| 6,978,474 B1 | 12/2005 | Sheppard et al. .............. 725/83 |
| 6,996,623 B1 | 2/2006 | Kawano et al. |
| 6,996,837 B1 * | 2/2006 | Miura et al. .................. 725/78 |
| 7,020,890 B1 * | 3/2006 | Suematsu et al. .............. 725/78 |
| 7,020,892 B2 | 3/2006 | Levesque et al. .............. 725/89 |
| 6,950,517 B2 | 5/2006 | Candelore ................... 725/87 |
| 7,039,169 B2 | 5/2006 | Jones ...................... 379/93.02 |
| 7,039,245 B1 | 5/2006 | Hamery |
| 7,042,526 B1 | 5/2006 | Borseth |
| 7,047,305 B1 * | 5/2006 | Brooks et al. ............... 709/231 |
| 7,054,289 B1 | 5/2006 | Foster et al. |
| 7,065,781 B1 | 6/2006 | Entwistle .................... 725/135 |
| 7,093,295 B1 | 8/2006 | Saito |
| 7,114,174 B1 * | 9/2006 | Brooks et al. ............... 725/105 |
| 7,116,894 B1 | 10/2006 | Chatterton |
| 7,127,734 B1 | 10/2006 | Amit |
| 7,130,576 B1 | 10/2006 | Gurantz et al. .............. 455/3.02 |
| 7,139,398 B2 | 11/2006 | Candelore et al. |
| 7,140,033 B1 * | 11/2006 | Durden et al. ................ 725/80 |
| 7,146,628 B1 | 12/2006 | Gordon et al. |
| 7,155,012 B2 | 12/2006 | Candelore et al. |
| 7,184,550 B2 | 2/2007 | Graunke |
| 7,185,355 B1 | 2/2007 | Ellis et al. .................... 725/46 |
| 7,190,901 B2 | 3/2007 | Farmer et al. |
| 7,209,667 B2 | 4/2007 | Lindblad |
| 7,218,738 B2 | 5/2007 | Pedlow et al. ............... 380/218 |
| 7,222,358 B2 | 5/2007 | Levinson et al. |
| 7,231,516 B1 | 6/2007 | Sparrell et al. .............. 713/156 |
| 7,233,669 B2 | 6/2007 | Candelore |
| 7,234,155 B1 | 6/2007 | Kay et al. ..................... 725/60 |
| 7,260,829 B1 | 8/2007 | Hendricks et al. |
| 7,278,154 B2 | 10/2007 | Harrison et al. |
| 7,305,700 B2 | 12/2007 | Boynton et al. ................ 726/4 |
| 7,310,355 B1 | 12/2007 | Krein et al. |
| 7,313,811 B1 | 12/2007 | Sheppard et al. |
| 7,336,787 B2 | 2/2008 | Unger et al. ................ 380/217 |
| 7,346,120 B2 | 3/2008 | McCorkle ................... 375/295 |
| 7,346,134 B2 | 3/2008 | Smith |
| 7,350,225 B2 | 3/2008 | Ovadia |
| 7,360,233 B2 | 4/2008 | Russ et al. |
| 7,360,235 B2 | 4/2008 | Davies et al. |
| 7,366,914 B2 | 4/2008 | Graunke .................... 713/190 |
| 7,392,389 B2 | 6/2008 | Kori ......................... 713/170 |
| 7,434,246 B2 | 10/2008 | Florence ...................... 725/46 |
| 7,487,532 B2 | 2/2009 | Robertson et al. ........... 725/111 |
| 7,516,470 B2 | 4/2009 | Russ et al. .................... 725/48 |
| 7,545,935 B2 | 6/2009 | Claussen ................... 380/200 |
| 7,574,723 B2 | 8/2009 | Putterman et al. |
| 7,603,684 B1 | 10/2009 | Ellis |
| 7,793,413 B2 | 9/2010 | Sakai et al. |
| 2001/0005906 A1 | 6/2001 | Humpleman |
| 2001/0011373 A1 | 8/2001 | Inoue ......................... 725/50 |
| 2001/0017920 A1 | 8/2001 | Son et al. |
| 2001/0030664 A1 | 10/2001 | Shulman et al. |
| 2001/0039660 A1 | 11/2001 | Vasilevsky et al. |
| 2002/0002707 A1 * | 1/2002 | Ekel et al. .................... 725/87 |
| 2002/0007485 A1 | 1/2002 | Rodriguez et al. |
| 2002/0007493 A1 | 1/2002 | Butler et al. |
| 2002/0010936 A1 | 1/2002 | Adam |
| 2002/0019984 A1 | 2/2002 | Rakib |
| 2002/0035726 A1 | 3/2002 | Corl |
| 2002/0035729 A1 | 3/2002 | Diep |
| 2002/0040475 A1 | 4/2002 | Yap et al. |
| 2002/0044762 A1 | 4/2002 | Wood et al. |
| 2002/0051200 A1 | 5/2002 | Chang et al. |
| 2002/0051581 A1 * | 5/2002 | Takeuchi et al. ............. 382/240 |
| 2002/0056112 A1 * | 5/2002 | Dureau et al. ................. 725/78 |
| 2002/0059615 A1 | 5/2002 | Okawara et al. |
| 2002/0059617 A1 | 5/2002 | Terakado et al. |
| 2002/0059623 A1 | 5/2002 | Rodriguez et al. ............ 725/91 |
| 2002/0059637 A1 | 5/2002 | Rakib |
| 2002/0059642 A1 | 5/2002 | Russ et al. ................... 725/135 |
| 2002/0066101 A1 | 5/2002 | Gordon et al. |
| 2002/0067437 A1 | 6/2002 | Tsubouchi et al. |
| 2002/0069417 A1 | 6/2002 | Kliger et al. |
| 2002/0083438 A1 | 6/2002 | So et al. |
| 2002/0087996 A1 * | 7/2002 | Bi et al. ....................... 725/89 |
| 2002/0090198 A1 | 7/2002 | Rosenberg et al. |
| 2002/0095673 A1 | 7/2002 | Leung et al. |
| 2002/0095689 A1 | 7/2002 | Novak |
| 2002/0100041 A1 | 7/2002 | Rosenberg et al. |
| 2002/0104001 A1 | 8/2002 | Lotspiech et al. |
| 2002/0108109 A1 | 8/2002 | Harris et al. ................. 725/32 |

| | | |
|---|---|---|
| 2002/0108121 A1 | 8/2002 | Alao et al. |
| 2002/0116626 A1 | 8/2002 | Wood |
| 2002/0122045 A1 | 9/2002 | Woodson et al. |
| 2002/0133558 A1 | 9/2002 | Fenno et al. |
| 2002/0137517 A1 | 9/2002 | Williams et al. |
| 2002/0138830 A1 | 9/2002 | Nagaoka et al. |
| 2002/0141582 A1 | 10/2002 | Kocher et al. |
| 2002/0144262 A1 | 10/2002 | Plotnick et al. |
| 2002/0146237 A1 | 10/2002 | Safadi ............ 386/94 |
| 2002/0154892 A1 | 10/2002 | Hoshen et al. |
| 2002/0157112 A1* | 10/2002 | Kuhn ............ 725/113 |
| 2002/0166124 A1 | 11/2002 | Gurantz et al. |
| 2002/0174430 A1 | 11/2002 | Ellis et al. |
| 2002/0174433 A1 | 11/2002 | Baumgartner et al. |
| 2002/0174444 A1* | 11/2002 | Gatto et al. ............ 725/133 |
| 2002/0178445 A1 | 11/2002 | Eldering |
| 2002/0187779 A1 | 12/2002 | Freeny |
| 2002/0194596 A1 | 12/2002 | Srivastava |
| 2002/0196941 A1 | 12/2002 | Isaacson et al. ............ 380/231 |
| 2002/0198762 A1 | 12/2002 | Donato ............ 705/10 |
| 2003/0005300 A1 | 1/2003 | Noble et al. |
| 2003/0005452 A1 | 1/2003 | Rodriguez ............ 725/86 |
| 2003/0009763 A1 | 1/2003 | Crinon et al. |
| 2003/0014750 A1 | 1/2003 | Kamen ............ 725/25 |
| 2003/0026423 A1 | 2/2003 | Unger et al. |
| 2003/0028886 A1 | 2/2003 | Wang et al. |
| 2003/0028890 A1 | 2/2003 | Swart et al. |
| 2003/0044165 A1 | 3/2003 | Wood et al. |
| 2003/0063003 A1 | 4/2003 | Bero et al. |
| 2003/0063814 A1 | 4/2003 | Herley |
| 2003/0069964 A1 | 4/2003 | Shteyn et al. ............ 709/225 |
| 2003/0074565 A1 | 4/2003 | Wasilewski et al. ............ 713/182 |
| 2003/0093812 A1 | 5/2003 | Chang et al. ............ 725/133 |
| 2003/0097563 A1 | 5/2003 | Moroney et al. |
| 2003/0097655 A1 | 5/2003 | Novak |
| 2003/0097663 A1 | 5/2003 | Russ et al. ............ 725/132 |
| 2003/0108199 A1 | 6/2003 | Pinder et al. |
| 2003/0108336 A1 | 6/2003 | Schramel |
| 2003/0135859 A1 | 7/2003 | Putterman et al. ............ 725/78 |
| 2003/0142664 A1 | 7/2003 | Gerszberg et al. |
| 2003/0145336 A1 | 7/2003 | Matsuzaki et al. |
| 2003/0149986 A1 | 8/2003 | Mayfield et al. |
| 2003/0149991 A1 | 8/2003 | Reidhead et al. |
| 2003/0154477 A1 | 8/2003 | Hassell et al. |
| 2003/0159140 A1 | 8/2003 | Candelore |
| 2003/0159157 A1 | 8/2003 | Chan |
| 2003/0177495 A1 | 9/2003 | Needham et al. |
| 2003/0181160 A1 | 9/2003 | Hirsch |
| 2003/0192047 A1 | 10/2003 | Gaul et al. ............ 725/39 |
| 2003/0192061 A1 | 10/2003 | Hwangbo et al. ............ 725/138 |
| 2003/0202772 A1 | 10/2003 | Dow et al. |
| 2003/0204856 A1 | 10/2003 | Buxton |
| 2003/0207672 A1 | 11/2003 | Dang et al. |
| 2003/0233667 A1 | 12/2003 | Umipig et al. |
| 2003/0235308 A1 | 12/2003 | Boynton et al. ............ 380/270 |
| 2003/0237093 A1 | 12/2003 | Marsh ............ 725/46 |
| 2004/0003393 A1 | 1/2004 | Gutta et al. ............ 725/25 |
| 2004/0012717 A1 | 1/2004 | Robertson et al. ............ 348/564 |
| 2004/0017913 A1 | 1/2004 | Hawkes et al. ............ 380/37 |
| 2004/0025179 A1 | 2/2004 | Russ et al. ............ 725/46 |
| 2004/0028216 A1 | 2/2004 | Freyman |
| 2004/0032902 A1 | 2/2004 | Koifman et al. |
| 2004/0032950 A1 | 2/2004 | Graunke |
| 2004/0034874 A1 | 2/2004 | Hord et al. |
| 2004/0040035 A1 | 2/2004 | Carlucci et al. |
| 2004/0049793 A1 | 3/2004 | Chou |
| 2004/0051638 A1 | 3/2004 | Green |
| 2004/0054771 A1 | 3/2004 | Roe et al. |
| 2004/0060072 A1 | 3/2004 | Klein ............ 725/127 |
| 2004/0003398 A1 | 4/2004 | Donian et al. |
| 2004/0064714 A1 | 4/2004 | Carr |
| 2004/0068739 A1 | 4/2004 | Russ et al. |
| 2004/0068744 A1 | 4/2004 | Claussen et al. ............ 725/81 |
| 2004/0068747 A1 | 4/2004 | Robertson |
| 2004/0068752 A1 | 4/2004 | Parker ............ 725/120 |
| 2004/0068753 A1 | 4/2004 | Robertson et al. ............ 725/126 |
| 2004/0068754 A1 | 4/2004 | Russ |
| 2004/0078825 A1* | 4/2004 | Murphy ............ 725/109 |
| 2004/0090971 A1 | 5/2004 | Anderson |
| 2004/0100897 A1 | 5/2004 | Shattil |
| 2004/0104926 A1 | 6/2004 | Murray et al. |
| 2004/0107445 A1* | 6/2004 | Amit ............ 725/127 |
| 2004/0109497 A1 | 6/2004 | Koval |
| 2004/0117483 A1 | 6/2004 | Singer et al. ............ 709/225 |
| 2004/0117831 A1 | 6/2004 | Ellis et al. ............ 725/53 |
| 2004/0128681 A1 | 7/2004 | Hancock |
| 2004/0128682 A1 | 7/2004 | Liga |
| 2004/0133911 A1 | 7/2004 | Russ et al. ............ 725/69 |
| 2004/0163130 A1 | 8/2004 | Gray et al. ............ 725/132 |
| 2004/0172658 A1* | 9/2004 | Rakib et al. ............ 725/120 |
| 2004/0177369 A1 | 9/2004 | Akins, III ............ 725/31 |
| 2004/0177381 A1 | 9/2004 | Kliger et al. |
| 2004/0220791 A1 | 11/2004 | Lamkin et al. |
| 2004/0221304 A1 | 11/2004 | Sparrel |
| 2004/0221308 A1 | 11/2004 | Cuttner et al. |
| 2004/0250272 A1 | 12/2004 | Durden et al. ............ 725/25 |
| 2004/0250273 A1 | 12/2004 | Swix et al. ............ 725/25 |
| 2004/0255326 A1* | 12/2004 | Hicks et al. ............ 725/81 |
| 2004/0257976 A1 | 12/2004 | Alsobrook et al. |
| 2004/0261100 A1 | 12/2004 | Huber et al. |
| 2004/0261126 A1 | 12/2004 | Addington et al. |
| 2005/0004873 A1 | 1/2005 | Pou et al. ............ 705/51 |
| 2005/0005287 A1 | 1/2005 | Claussen ............ 725/31 |
| 2005/0022248 A1 | 1/2005 | Robertson et al. |
| 2005/0028190 A1 | 2/2005 | Rodriguez et al. |
| 2005/0028208 A1* | 2/2005 | Ellis et al. ............ 725/58 |
| 2005/0030910 A1 | 2/2005 | Robertson et al. ............ 370/276 |
| 2005/0042999 A1 | 2/2005 | Rappaport |
| 2005/0050557 A1 | 3/2005 | Gabryjelski et al. |
| 2005/0063422 A1 | 3/2005 | Lazar et al. |
| 2005/0065780 A1* | 3/2005 | Wiser et al. ............ 704/201 |
| 2005/0073945 A1 | 4/2005 | Garcia, Jr. et al. |
| 2005/0155052 A1 | 7/2005 | Ostrowska |
| 2005/0234992 A1 | 10/2005 | Haberman ............ 707/104.1 |
| 2005/0235323 A1 | 10/2005 | Ellis et al. |
| 2005/0251824 A1 | 11/2005 | Thomas et al. |
| 2005/0251827 A1* | 11/2005 | Ellis et al. ............ 725/47 |
| 2005/0262542 A1* | 11/2005 | DeWeese et al. ............ 725/106 |
| 2006/0010481 A1 | 1/2006 | Wall et al. ............ 725/151 |
| 2006/0069645 A1 | 3/2006 | Chen et al. |
| 2006/0080360 A1 | 4/2006 | Young et al. ............ 707/104.1 |
| 2006/0095939 A1 | 5/2006 | Jutzi ............ 725/78 |
| 2006/0117354 A1 | 6/2006 | Schutte et al. ............ 725/78 |
| 2006/0150225 A1 | 7/2006 | Hegg et al. ............ 725/89 |
| 2006/0184967 A1 | 8/2006 | Maynard et al. ............ 725/46 |
| 2006/0218581 A1 | 9/2006 | Ostrowka et al. ............ 725/38 |
| 2006/0218591 A1 | 9/2006 | Billmaier et al. |
| 2006/0259584 A1 | 11/2006 | Watson et al. |
| 2007/0022307 A1 | 1/2007 | Ferrari |
| 2007/0077038 A1 | 4/2007 | Wall |
| 2007/0079341 A1 | 4/2007 | Russ et al. ............ 725/89 |
| 2007/0094698 A1 | 4/2007 | Bountour et al. ............ 725/132 |
| 2007/0143776 A1 | 6/2007 | Russ ............ 725/14 |
| 2007/0300258 A1 | 12/2007 | O'Conner et al. ............ 725/44 |
| 2008/0066085 A1 | 3/2008 | Davies et al. ............ 719/321 |
| 2008/0072272 A1 | 3/2008 | Robertson et al. |
| 2008/0148325 A1 | 6/2008 | Robertson et al. ............ 725/98 |
| 2008/0201758 A1 | 8/2008 | Davies et al. ............ 725/133 |
| 2008/0271094 A1 | 10/2008 | Kliger et al. |
| 2008/0301738 A1 | 12/2008 | Davies et al. ............ 725/87 |
| 2009/0077586 A1 | 3/2009 | Wall et al. |
| 2009/0083819 A1 | 3/2009 | Robertson et al. |

| | | | |
|---|---|---|---|
| 2009/0150922 | A1 | 6/2009 | Russ et al. |
| 2009/0193452 | A1 | 7/2009 | Russ et al. |
| 2010/0175093 | A1 | 7/2010 | Arnold et al. |

FOREIGN PATENT DOCUMENTS

| | | |
|---|---|---|
| EP | 0989557 | 3/2000 |
| EP | 1028551 | 8/2000 |
| EP | 107600 | 6/2001 |
| EP | 1117214 | 7/2001 |
| EP | 1175087 | 7/2001 |
| EP | 1145244 A1 | 10/2001 |
| EP | 1213919 | 6/2002 |
| EP | 1443766 | 8/2004 |
| EP | 1463324 | 9/2004 |
| WO | WO 95/25402 | 9/1995 |
| WO | WO 96/19079 | 6/1996 |
| WO | WO 98/26584 | 6/1998 |
| WO | WO 98/37648 | 8/1998 |
| WO | WO 99/01984 | 1/1999 |
| WO | WO 99/35844 | 7/1999 |
| WO | WO 99/65244 | 12/1999 |
| WO | WO 00/04707 | 1/2000 |
| WO | WO 00/07372 | 2/2000 |
| WO | WO 00/45590 | 3/2000 |
| WO | WO 00/35201 | 6/2000 |
| WO | WO 01/01677 | 1/2001 |
| WO | WO 01/47234 | 6/2001 |
| WO | WO 01/56286 | 8/2001 |
| WO | WO 01/56297 | 8/2001 |
| WO | WO 01/74003 | 10/2001 |
| WO | WO 01/78382 | 10/2001 |
| WO | WO 01/86948 | 11/2001 |
| WO | WO 2002/07378 A1 | 1/2002 |
| WO | WO 02/11418 | 2/2002 |
| WO | WO 02/11446 | 2/2002 |
| WO | WO 02/17642 | 2/2002 |
| WO | WO 02/19623 | 3/2002 |
| WO | WO 02/47388 A2 | 6/2002 |
| WO | WO 02/097997 | 12/2002 |
| WO | WO 03/032620 | 4/2003 |
| WO | WO 03/039154 | 5/2003 |
| WO | WO 2004/023717 | 3/2004 |
| WO | WO 2004/032514 | 4/2004 |
| WO | WO 2004/036808 | 4/2004 |
| WO | WO 2004/036892 | 4/2004 |
| WO | WO 2004/064296 | 7/2004 |
| WO | WO 2004/098190 | 11/2004 |
| WO | WO 2005/034515 A1 | 4/2005 |
| WO | WO 2006/093741 | 9/2006 |

OTHER PUBLICATIONS

Kerr, G., "A Review of Fully Interactive Video on Demand" Signal Processing. Image Communication, Elsevier Science Publishers, Amsterdam, NL, vol. 8, No. 3, Apr. 1996, pp. 173-190, XP004047063 ISSN: 0923-5965.
Alexis De Lattre et al., Videolan Streaming (online) Feb. 12, 2005, pp. 1-14 (Cited by Examiner, no copy available).
Alexis De Lattre et al., Videolan Streaming Howto, 2005, pp. 1-61 (Cited by Examiner, no copy available).
Microsoft Computer Dictionary, 1999, Microsoft Press, 4$^{th}$ Edition, p. 123.
U.S. Appl. No. 09/332,244; Ellis et al., filed Jun. 11, 1999 is included by reference by 2005/0028208 (Not published).
U.S. Appl. No. 10/104,921, filed Mar. 22, 2002, Entitled "Exporting Data from a Digital Home Communication Terminal to a Client Device," Inventors: Gual, et al.
U.S. Appl. No. 10/212,017, filed Aug. 2, 2002, Entitled "Locally-Updated Interactive Program Guide," Inventors: Russ et al.
U.S. Appl. No. 10/263,270, filed Oct. 2, 2002, Entitled "Video Transmission Systems and Methods for a Home Network," Inventors: Robertson et al.
U.S. Appl. No. 10/342,270, filed Jan. 15, 2003, Entitled "Networked Multimedia System," Inventors: Robertson et al.
U.S. Appl. No. 10/403,485, filed Mar. 31, 2003, Entitled "Networked Multimedia System having a Multi-Room Interactive Network Guide," Inventors: Russ et al.
U.S. Appl. No. 10/998,879, filed Nov. 29, 2004, Entitled "Consolidating Video on Demand (VOD) Services with Multi-Room Personal Video Recording (MR-PVR) Services," Inventors: Schutte, et al.
U.S. Appl. No. 10/294,947, filed Nov. 14, 2002, Entitled "Networked Subscriber Television Distribution," Inventors: Russ, et al.
U.S. Appl. No. 10/676,968, filed Oct. 1, 2003, Entitled "Proximity Detection using Wireless Connectivity in a Communications System," Inventors: Claussen, et al.
U.S. Appl. No. 11/069,440, filed Mar. 1, 2004, Entitled "Interactive Network Guide with Parental Monitoring," Inventors: Ostrowska, et al.
U.S. Appl. No. 10/924,077, filed Aug. 23, 2004, Entitled "Full Duplex Wideband Communications System for a Local Coaxial Network," Inventors: Robertson, et al.
U.S. Appl. No. 10/842,823, filed May 11, 2004, Entitled "Networked Multimedia Overlay System," Inventor: P. J. Claussen.
U.S. Appl. No. 11/564,347, filed Nov. 29, 2006, Entitled "Viewer Data Collection in a Multi-Room Network," Inventor: Russ, Samuel H.
U.S. Appl. No. 11/162,232, filed Sep. 2, 2005, Entitled "Multiroom Point of Deployment Module," Inventors: Wall, et al.
U.S. Appl. No. 10/923,948, filed Aug. 23, 2004, Entitled "Optimization of a Full Duplex Wideband Communications System," Inventors: Robertson, et al.
U.S. Appl. No. 11/069,439, filed Mar. 1, 2005, Entitled "Parental Control for a Networked Multi-Room System," Inventors: Ostrowska, et al.
U.S. Appl. No. 10/036,329, filed Feb. 25, 2008, Entitled "Full Duplex Wideband Modem Communications system for a Local Coaxial Network," Inventors: Robertson, et al.
U.S. Official Office Action mailed Mar. 21, 2009 in U.S. Appl. No. 10/294,947, pp. 1-7.
U.S. Official Office Action mailed Oct. 5, 2007 in U.S. Appl. No. 10/294,947, pp. 1-9.
U.S. Official Office Action mailed May 15, 2008 in U.S. Appl. No. 10/294,947, pp. 1-9.
U.S. Official Office Action mailed Dec. 12, 2008 in U.S. Appl. No. 10/294,947, pp. 1-9.
SCTE, "POD Copy Protection System," SCTE Society of Cable Telecommunications Engineers, [Online] Dec. 31, 2004, pp. 1-68, XP002414048, http://www.scte.org/documents/pdf/ANSISCTE412004.pdf.
Delta Beta In-Flight, www.deltabeta.com, retrieved from the internet on Jul. 17, 2008.
SCTE, "Client-Based Digital Program Insertion Business Goal," DVS/632rl, Mar. 27, 2004.
SCTE, "Working Group Work Plan 5," DVS 177, Sep. 1, 1998.
SCTE, "Proposed Amendment of SCTE 30 2001 Digital Program Insertion Splicing API," DVS 638r3, Feb. 4, 2005.
Broadcast Engineering, "Digital Program Insertion," Business Models, Jul. 1, 2002.
nCUBE, "Digital Program Insertion," nCUBE, May 2001.
Matsushita Electric Industrial Co., Ltd. "DVB Call for Proposals for Content Protection & Copy Management Technologies," NetDRM Technology, XP002349078, Oct. 19, 2001, pp. 1-44.
Written Opinion mailed Nov. 7, 2005 in PCT Application No. PCT/US2005/016290.
International Search Report dated Oct. 31, 2005 in PCT Application No. PCT/US2005/016290.
EP Communication dated Jul. 12, 2007 in Application No. 05 748 223.4-1241.
International Preliminary Examination Report dated Dec. 21, 2005 in PCT/US2003/32527.
Written Opinion mailed Dec. 10, 2004 in PCT/US2003/32527.
International Search Report dated Nov. 10, 2004 in PCT/US2003/32527.
International Preliminary Examination Report dated Jan. 18, 2006 in PCT/US2003/33686.

Written Opinion mailed Jun. 3, 2005 in PCT/US2003/33686.
International Search Report dated Feb. 6, 2004 in PCT/US2003/33686.
Canadian Office Action dated May 30, 2008 in Application No. 2,520,505.
Canadian Office Action dated Sep. 4, 2008 in Application No. 2,501,865.
International Search Report dated Sep. 29, 2006 in PCT/US2006/006199.
Written Opinion dated Oct. 12, 2006 in PCT/US2006/006199.
International Search Report dated Jan. 10, 2007 in PCT/US2006/033967.
Written Opinion mailed Mar. 2, 2007 in PCT/US2006/033967.
EP Communication dated Oct. 14, 2009 in Application No. 03 777 604.4-1241.
Supplementary European Search Report dated Jun. 18, 2009 in Application No. 03 777 604.4.
EP Communication dated May 27, 2009 in Application No. 03 774 942.1.
Supplementary European Search Report dated Feb. 6, 2009 in Application No. 03 774 942.1-1241.
International Search Report dated Mar. 1, 2005 in OCT/US2004/032389.
U.S. Official Action mailed Dec. 5, 2003 in U.S. Appl. No. 10/235,201.
U.S. Official Action mailed Feb. 13, 2004 in U.S. Appl. No. 10/342,670.
U.S. Official Action mailed May 7, 2004 in U.S. Appl. No. 10/235,201.
U.S. Official Action mailed Jul. 27, 2004 in U.S. Appl. No. 10/342,670.
U.S. Official Action mailed Sep. 10, 2004 in U.S. Appl. No. 10/437,556.
U.S. Official Action mailed Mar. 21, 2005 in U.S. Appl. No. 10/212,017.
U.S. Official Action mailed Mar. 23, 2005 in U.S. Appl. No. 10/342,670.
U.S. Official Action mailed Jun. 15, 2005 in U.S. Appl. No. 10/437,556.
U.S. Official Action mailed Jul. 27, 2005 in U.S. Appl. No. 10/235,201.
U.S. Official Action mailed Aug. 11, 2005 in U.S. Appl. No. 10/342,670.
U.S. Official Action mailed Oct. 19, 2005 in U.S. Appl. No. 10/212,017.
U.S. Official Action mailed Jan. 11, 2006 in U.S. Appl. No. 10/235,201.
U.S. Official Action mailed Jan. 30, 2006 in U.S. Appl. No. 10/437,556.
U.S. Official Action mailed Feb. 8, 2006 in U.S. Appl. No. 10/342,670.
U.S. Official Action mailed Apr. 19, 2006 in U.S. Appl. No. 10/212,017.
U.S. Official Action mailed Jun. 28, 2006 in U.S. Appl. No. 10/342,670.
U.S. Official Action mailed Jun. 30, 2006 in U.S. Appl. No. 10/437,556.
U.S. Official Action mailed Jul. 31, 2006 in U.S. Appl. No. 10/235,201.
U.S. Official Action mailed Oct. 31, 2006 in U.S. Appl. No. 10/342,670.
U.S. Official Action mailed Nov. 17, 2006 in U.S. Appl. No. 10/235,201.
U.S. Official Action mailed Nov. 20, 2006 in U.S. Appl. No. 10/437,556.
U.S. Official Action mailed Mar. 21, 2007 in U.S. Appl. No. 10/294,947.
U.S. Official Action mailed May 3, 2007 in U.S. Appl. No. 10/437,556.
U.S. Official Action mailed May 4, 2007 in U.S. Appl. No. 10/263,160.
U.S. Official Action mailed May 4, 2007 in U.S. Appl. No. 10/924,077.
U.S. Official Action mailed May 7, 2007 in U.S. Appl. No. 10/342,670.
U.S. Official Action mailed May 8, 2007, in U.S. Appl. No. 10/263,449.
U.S. Official Action mailed Jul. 10, 2007 in U.S. Appl. No. 10/104,921.
U.S. Official Action mailed Jul. 10, 2007 in U.S. Appl. No. 10/263,270.
U.S. Official Action mailed Jul. 18, 2007 in U.S. Appl. No. 11/162,232.
U.S. Official Action mailed Sep. 4, 2007 in U.S. Appl. No. 10/712,289.
U.S. Official Action mailed Sep. 10, 2007 in U.S. Appl. No. 10/842,823.
U.S. Official Action mailed Oct. 5, 2007 in U.S. Appl. No. 10/294,947.
U.S. Official Action mailed Nov. 15, 2007 in U.S. Appl. No. 10/924,077.
U.S. Official Action mailed Nov. 16, 2007 in U.S. Appl. No. 10/263,160.
U.S. Official Action mailed Nov. 29, 2007 in U.S. Appl. No. 10/104,921.
U.S. Official Action mailed Nov. 30, 2007 in U.S. Appl. No. 10/263,449.
U.S. Official Action mailed Jan. 4, 2008 in U.S. Appl. No. 10/342,670.
U.S. Official Action mailed Jan. 10, 2008 in U.S. Appl. No. 10/923,948.
U.S. Official Action mailed Jan. 14, 2008 in U.S. Appl. No. 10/263,270.
U.S. Official Action mailed Jan. 29, 2008 in U.S. Appl. No. 11/162,232.
U.S. Official Action mailed Feb. 8, 2008 in U.S. Appl. No. 10/403,485.
U.S. Official Action mailed Mar. 18, 2008 in U.S. Appl. No. 10/924,077.
U.S. Official Action mailed Mar. 19, 2008 in U.S. Appl. No. 10/712,289.
U.S. Official Action mailed Apr. 4, 2008 in U.S. Appl. No. 10/842,823.
U.S. Official Action mailed Apr. 24, 2008 in U.S. Appl. No. 10/104,921.
U.S. Official Action mailed May 13, 2008 in U.S. Appl. No. 10/263,160.
U.S. Official Action mailed May 15, 2008 in U.S. Appl. No. 10/294,947.
U.S. Offiical Action mailed Jun. 2, 2008 in U.S. Appl. No. 10/998,879.
U.S. Official Action mailed Jun. 12, 2008 in U.S. Appl. No. 10/263,449.
U.S. Official Action mailed Jun. 30, 2008 in U.S. Appl. No. 10/907,540.
U.S. Official Action mailed Jul. 8, 2008 in U.S. Appl. No. 11/069,439.
U.S. Official Action mailed Jul. 9, 2008 in U.S. Appl. No. 11/069,440.
U.S. Official Action mailed Jul. 25, 2008 in U.S. Appl. No. 10/342,670.
U.S. Official Action mailed Sep. 5, 2008 in U.S. Appl. No. 11/162,232.
U.S. Official Action mailed Sep. 5, 2008 in U.S. Appl. No. 10/263,270.
U.S. Official Action mailed Sep. 17, 2008 in U.S. Appl. No. 10/403,485.
U.S. Official Action mailed Sep. 18, 2008 in U.S. Appl. No. 10/008,581.
U.S. Official Action mailed Sep. 19, 2008 in U.S. Appl. No. 10/263,160.
U.S. Official Action mailed Sep. 26, 2008 in U.S. Appl. No. 10/212,017.
U.S. Official Action mailed Oct. 21, 2008 in U.S. Appl. No. 10/842,823.

U.S. Official Action mailed Oct. 22, 2008 in U.S. Appl. No. 10/924,077.
U.S. Official Action mailed Oct. 29, 2008 in U.S. Appl. No. 10/712,289.
U.S. Official Action mailed Nov. 6, 2008 in U.S. Appl. No. 10/104,921.
U.S. Official Action mailed Nov. 26, 2008 in U.S. Appl. No. 11/069,439.
U.S. Official Action mailed Nov. 28, 2008 in U.S. Appl. No. 10/998,879.
U.S. Official Action mailed Dec. 12, 2008 in U.S. Appl. No. 10/294,947.
U.S. Official Action mailed Dec. 23, 2008 in U.S. Appl. No. 11/163,107.
U.S. Official Action mailed Jan. 7, 2009 in U.S. Appl. No. 10/904,540.
U.S. Official Action mailed Jan. 23, 2009 in U.S. Appl. No. 11/169,440.
U.S. Official Action mailed Jan. 28, 2009 in U.S. Appl. No. 10/342,670.
U.S. Official Action mailed Feb. 4, 2009 in U.S. Appl. No. 10/263,449.
U.S. Official Action mailed Feb. 6, 2009 in U.S. Appl. No. 10/263,270.
U.S. Official Action mailed Feb. 9, 2009 in U.S. Appl. No. 10/008,581.
U.S. Official Action mailed Mar. 2, 2009 in U.S. Appl. No. 11/564,347.
U.S. Official Action mailed Mar. 13, 2009 in U.S. Appl. No. 11/069,439.
U.S. Official Action mailed Mar. 18, 2009 in U.S. Appl. No. 10/403,485.
U.S. Official Action mailed Mar. 20, 2009 in U.S. Appl. No. 11/162,232.
U.S. Official Action mailed Apr. 3, 2009 in U.S. Appl. No. 10/263,160.
U.S. Official Action mailed Apr. 15, 2009 in U.S. Appl. No. 10/712,289.
U.S. Official Action mailed May 21, 2009 in U.S. Appl. No. 10/294,947.
U.S. Official Action mailed May 21, 2009 in U.S. Appl. No. 10/998,879.
U.S. Official Action mailed Jun. 10, 2009 in U.S. Appl. No. 10/907,540.
U.S. Official Action mailed Jun. 11, 2009 in U.S. Appl. No. 10/104,921.
U.S. Official Action mailed Jul. 29, 2009 in U.S. Appl. No. 10/924,077.
U.S. Official Action mailed Aug. 19, 2009 in U.S. Appl. No. 11/069,440.
U.S. Official Action mailed Aug. 28, 2009 in U.S. Appl. No. 10/263,449.
U.S. Official Action mailed Sep. 1, 2009 in U.S. Appl. No. 10/263,270.
U.S. Official Action mailed Sep. 3, 2009 in U.S. Appl. No. 10/403,485.
U.S. Official Action mailed Sep. 4, 2009 in U.S. Appl. No. 11/564,347.
U.S. Official Action mailed Sep. 11, 2009 in U.S. Appl. No. 10/263,160.
U.S. Official Action mailed Sep. 29, 2009 in U.S. Appl. No. 10/712,289.
U.S. Official Action mailed Sep. 30, 2009 in U.S. Appl. No. 11/069,439.
U.S. Official Action mailed Oct. 16, 2009 in U.S. Appl. No. 12/056,812.
U.S. Official Action mailed Nov. 16, 2009 in U.S. Appl. No. 10/907,540.
PCT, Notification of Transmittal and International Search Report for PCT/US2004/032389, mailed Mar. 14, 2005, pp. 1-4.
Canadian Office Action dated Jul. 24, 2009 in Application No. 2,566,742.
EP Summons to attend oral proceedings dated Jan. 27, 2010 in Application No. 03 774 942.1-1241.
U.S. Official Action mailed Nov. 2, 2007 in U.S. Appl. No. 10/676,968.
U.S. Official Action mailed May 1, 2008 in U.S. Appl. No. 10/923,948.
U.S. Official Action mailed Jul. 23, 2008 in U.S. Appl. No. 10/676,968.
U.S. Official Action mailed Dec. 26, 2008 in U.S. Appl. No. 11/164,337.
U.S. Official Action mailed Apr. 6, 2009 in U.S. Appl. No. 11/945,284.
U.S. Official Action mailed Jul. 21, 2009 in U.S. Appl. No. 11/164,337.
U.S. Official Action mailed Oct. 6, 2009 in U.S. Appl. No. 12/352,140.
U.S. Official Action mailed Oct. 29, 2009 in U.S. Appl. No. 11/945,284.
U.S. Official Action mailed Nov. 30, 2009 in U.S. Appl. No. 10/998,879.
U.S. Official Action mailed Dec. 16, 2009 in U.S. Appl. No. 10/294,947.
U.S. Official Action mailed Dec. 16, 2009 in U.S. Appl. No. 11/564,347.
U.S. Official Action mailed Dec. 30, 2009 in U.S. Appl. No. 11/164,337.
U.S. Official Action mailed Jan. 14, 2010 in U.S. Appl. No. 10/104,921.
U.S Official Action mailed Jan. 21, 2010 in U.S. Appl. No. 11/069,439.
U.S. Official Action mailed Jan. 25, 2010 in U.S. Appl. No. 11/162,232.
U.S. Official Action mailed Jan. 28, 2010 in U.S. Appl. No. 10/924,077.
U.S. Official Action mailed Feb. 17, 2010 in U.S. Appl. No. 10/263,449.
U.S. Official Action mailed Feb. 24, 2010 in U.S. Appl. No. 10/403,485.
U.S. Official Action mailed Mar. 1, 2010 in U.S. Appl. No. 10/712,289.
U.S. Official Action mailed Mar. 3, 2010 in U.S. Appl. No. 10/263,160.
U.S. Official Action mailed Apr. 7, 2010 in U.S. Appl. No. 12/056,812.
Supplementary European Search Report dated Jul. 14, 2005 in Application No. 03 74 5552.
International Search Report dated Jun. 14, 2006 in PCT/US2006/006201.
International Search Report dated Sep. 28, 2006 in PCT/US2006/010764.
EP Communication dated Mar. 10, 2008 in Application No. 05 852 294.7.
International Search Report dated Jun. 9, 2008 in PCT/US2007/085694.
EP Communication dated Jul. 18, 2008 in Application No. 05 852 294.7.
EP Communication dated Feb. 27, 2009 in Application No. 06 739 511.1.
EP Communication dated Apr. 6, 2009 in Application No. 05 852 294.7-1522.
Canadian Office Action dated Apr. 15, 2009 in Application No. 2,478,838.
EP Communication dated Aug. 24, 2009 in Application No. 06 735 737.6-1241.
Canadian Office Action dated Oct. 5, 2009 in Application No. 2,588,912.
EP Communication dated Oct. 29, 2009 in Application No. 06 815 494.7.
Canadian Office Action dated Nov. 2, 2009 in Application No. 2,599,947.
Canadian Office Action dated Nov. 2, 2009 in Application No. 2,603,257.

Canadian Office Action dated Dec. 15, 2009 in Application No. 2,520,505.
Canadian Office Action dated Jan. 13, 2010 in Application No. 2,541,161.
Canadian Office Action dated Mar. 4, 2010 in Application No. 2,599,941.
EP Communication dated Mar. 18, 2010 in Application No. 06 815 494.7.
EP Communication dated Apr. 12, 2010 in Application No. 03 777 604.4-1241.
Canadian Office Action dated Jul. 2, 2010 in Application No. 2,630,123.
U.S. Official Action mailed May 31, 2005 in U.S. Appl. No. 09/332,244.
U.S. Official Action mailed Sep. 20, 2006 in U.S. Appl. No. 10/036,329.
U.S. Official Action mailed Dec. 19, 2006 in U.S. Appl. No. 09/332,244.
U.S. Official Action mailed May 29, 2007 in U.S. Appl. No. 10/036,329.
U.S. Official Action mailed Jun. 27, 2007 in U.S. Appl. No. 09/332,244.
U.S. Official Action mailed May 5, 2010 in U.S. Appl. No. 10/998,879.
U.S. Official Action mailed May 18, 2010 in U.S. Appl. No. 10/907,540.
U.S. Official Action mailed May 25, 2010 in U.S. Appl. No. 11/069,439.
U.S. Official Action mailed May 26, 2010 in U.S. Appl. No. 10/263,270.
U.S. Official Action mailed Jun. 8, 2010 in U.S. Appl. No. 11/564,347.
U.S. Official Action mailed Jul. 16, 2010 in U.S. Appl. No. 11/164,337.
U.S. Official Action mailed Jul. 27, 2010 in U.S. Appl. No. 10/924,077.
U.S. Appl. No. 09/332,244 filed Jun. 11, 1999 entitled "Client-Server Based Interactive Television Program Guide System With Remote Server Recording", Inventors: Michael Ellis, William Thomas, Thomas Lemmons.
U.S. Appl. No. 09/354,344 filed Jul. 16, 1999 entitled "Interactive Television Program Guide With Remote Access", Inventors: Michael Ellis, William Thomas, Joel Hassell, Thomas Lemmons, David Berezowski, Robert Knee, Robert McCoy.
U.S. Appl. No. 09/356,161 filed Jul. 16, 1999 entitled "Interactive Television Program Guide System Having Multiple Devices Within a Household", Inventors: Michael Ellis, William Thomas, Thomas Lemmons.
U.S. Appl. No. 09/568,932 filed May 11, 2000 entitled "Electronic Content Guide Renders Content Resources Transparent", Inventors: Eugene Shteyn et al.
International Search Report dated Jan. 25, 2007 in PCT/US2006/037542.
Written Opinion dated Jan. 25, 2007 in PCT/US2006/037542.
International Search Report dated Oct. 29, 2007 in PCT/US2006/060967.
Written Opinion dated Oct. 29, 2007 in PCT/US2006/060967.
U.S. Official Action mailed Aug. 17, 2010 in U.S. Appl. No. 12/036,329.
U.S. Official Action mailed Aug. 20, 2010 in U.S. Appl. No. 11/945,284.
U.S. Official Action mailed Aug. 27, 2010 in U.S. Appl. No. 10/403,485.
U.S. Official Action mailed Aug. 31, 2010 in U.S. Appl. No. 12/416,392.
U.S. Official Action mailed Sep. 9, 2010 in U.S. Appl. No. 10/998,879.
U.S. Official Action mailed Sep. 14, 2010 in U.S. Appl. No. 11/942,077.
U.S. Appl. No. 09/262,870 filed Mar. 4, 1999 entitled "Program Guide System with Video-On-Demand Browsing," Inventors: Michael D. Ellis.
Canadian Office Action dated Sep. 1, 2010 in Application No. 2,494,494.
U.S. Official Action mailed Oct. 15, 2010 in U.S. Appl. No. 10/907,540.

* cited by examiner

NETWORKED SUBSCRIBER TELEVISION DISTRIBUTION

CROSS-REFERENCE TO RELATED APPLICATIONS

This application claims the benefit of U.S. provisional patent application No. 60/248,485, entitled "Wireless Remote Display Settop Box" filed on Nov. 14, 2000, which is entirely incorporated herein by reference.

TECHNICAL FIELD

The present invention is generally related to television and its distribution and, more particularly, is related to a system and method for providing an interactive television signal that obviates the need for numerous cable jacks.

BACKGROUND OF THE INVENTION

For many years cable service providers have been in existence providing cable television to millions of subscribers in the United States and around the world. Cable television has become so ubiquitous that the set top box is almost instantly recognizable to the entire American population. Generally, a set top box works by hooking the set top box via a short coaxial (coax) cable into a coax outlet. The coax outlet is generally placed either during the construction of the building, or by the cable company during installation. If the coax outlet is placed during construction of the building, it is likely that there will be a coax outlet in many of the rooms. However, if the outlets are placed during installation, the installer may charge more for each outlet installed, thus forcing the owner to effectively perform a cost-benefit analysis. The coax outlet then typically connects via coax cable to a distribution hub which often serves several different subscribers.

Wireless technologies have developed quickly over the past few years, enabling enormous amounts of data to be pumped through a wireless connection. The Institute for Electronics and Electrical Engineers (IEEE) 802.11b standard enables the user to transfer data at a rate approximately equal to ethernet data rates, about 10 Mbps. As such it is sometimes called wireless ethernet. IEEE 802.11a enables transfer rates of up to 54 Mbps. An industry collaboration, Bluetooth 2.0 enables users to transfer data at a rate of about 10 Mbps. HomeRF 2.0 is another industry collaboration, backed by a few of the same companies promoting the Bluetooth standard, and like Bluetooth 2.0, has a maximum data transfer rate of about 10 Mbps.

Internet video conferencing developed during the same time period, allowing video transfer over the internet. Early internet video conferencing tools used very low quality video, enabling early networks to transfer video. However, technology advances have increased bandwidths, allowing video conferencing tools to become more complex. These video conferencing tools are useful in the business world, where subscribers do not have high expectations when it comes to video quality, synchronization, jitter and latency between encoding and viewing, all of which exist in present video conferencing systems to some extent. However, when it comes to entertainment, subscriber demands are much higher because of the vast array of high quality home entertainment already in the marketplace. These problems cannot be solved by forcing subscribers to lower their expectations, because of the enormous number of other choices providing high quality home entertainment solutions. Thus, there exists a heretofore unaddressed need in the industry.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

The preferred embodiments of the invention now will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. Furthermore, all "examples" given herein are intended to be non-limiting.

Figure 1:
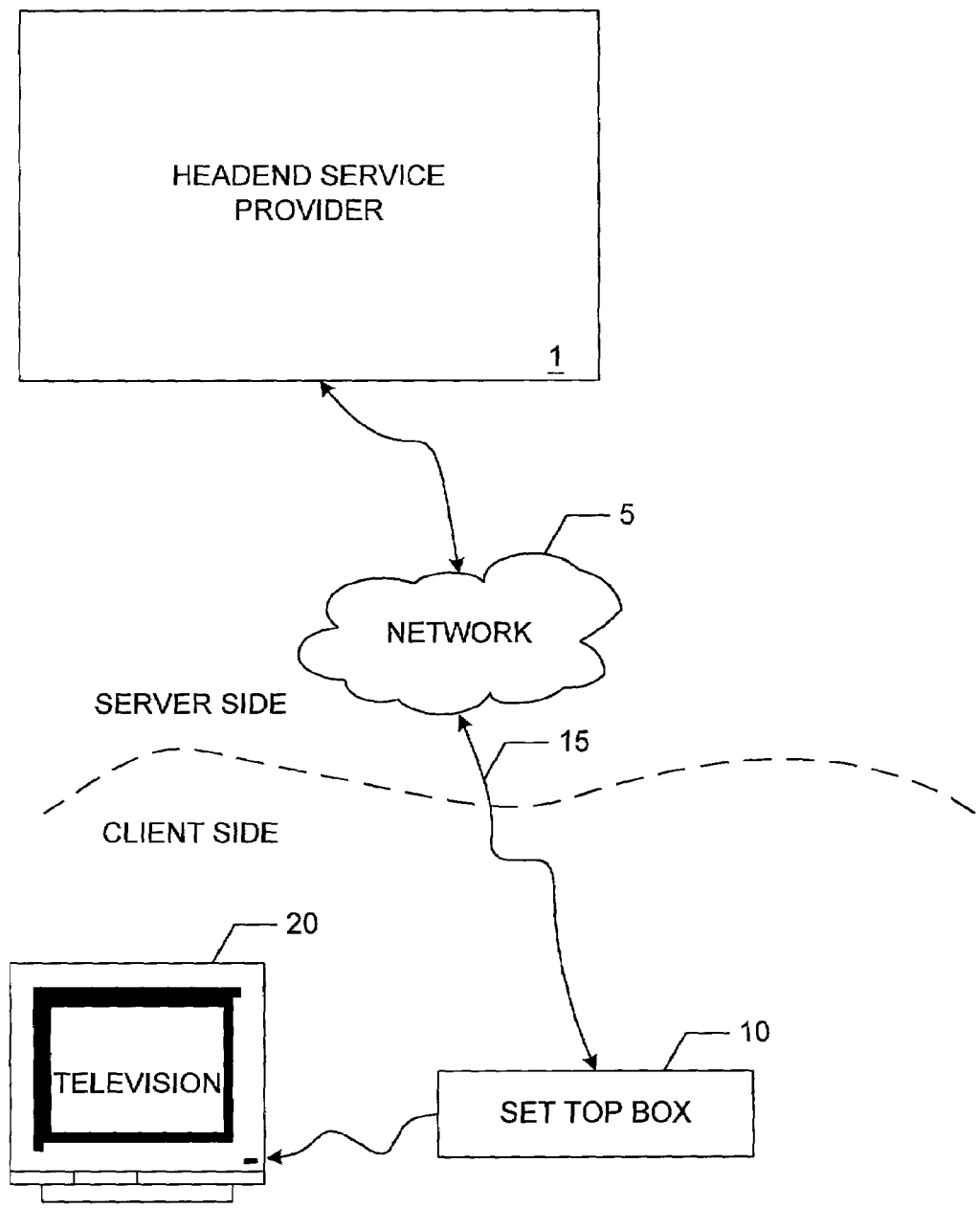
FIG. 1 is a block diagram of a typical video distribution scheme.

Referring to FIG. 1, a typical video distribution scheme among cable service providers is shown. The headend service provider 1 generally receives a plurality of audio/video (often referred to as video herein) television programs (media content instances) either through a direct connection to another source, or through a satellite communications network. The headend service provider 1 then modulates the plurality of programs into what is ultimately a single audio/video signal. In alternate implementations, broadband multiplexing techniques are used, allowing the plurality of programs to be multiplexed into a plurality of channels, or program streams, prior to being multiplexed again into the single audio/video signal. Furthermore, the headend 1 sends out-of-band signals that implicate interactive program guide applications, and other applications used by the subscriber. The multiplexed audio/video signal is then distributed through a distribution network 5. Ultimately, the multiplexed audio/video signal arrives at the set top box 10, generally through a coax cable 15 running from a drop box to the set top box located in a house.

At the set top box a program stream is tuned, decoded (as necessary), and sent to the television 20 for viewing. The distribution system above is modified by the implementation of the various embodiments of the present invention, described hereinafter.

Figure 1A:
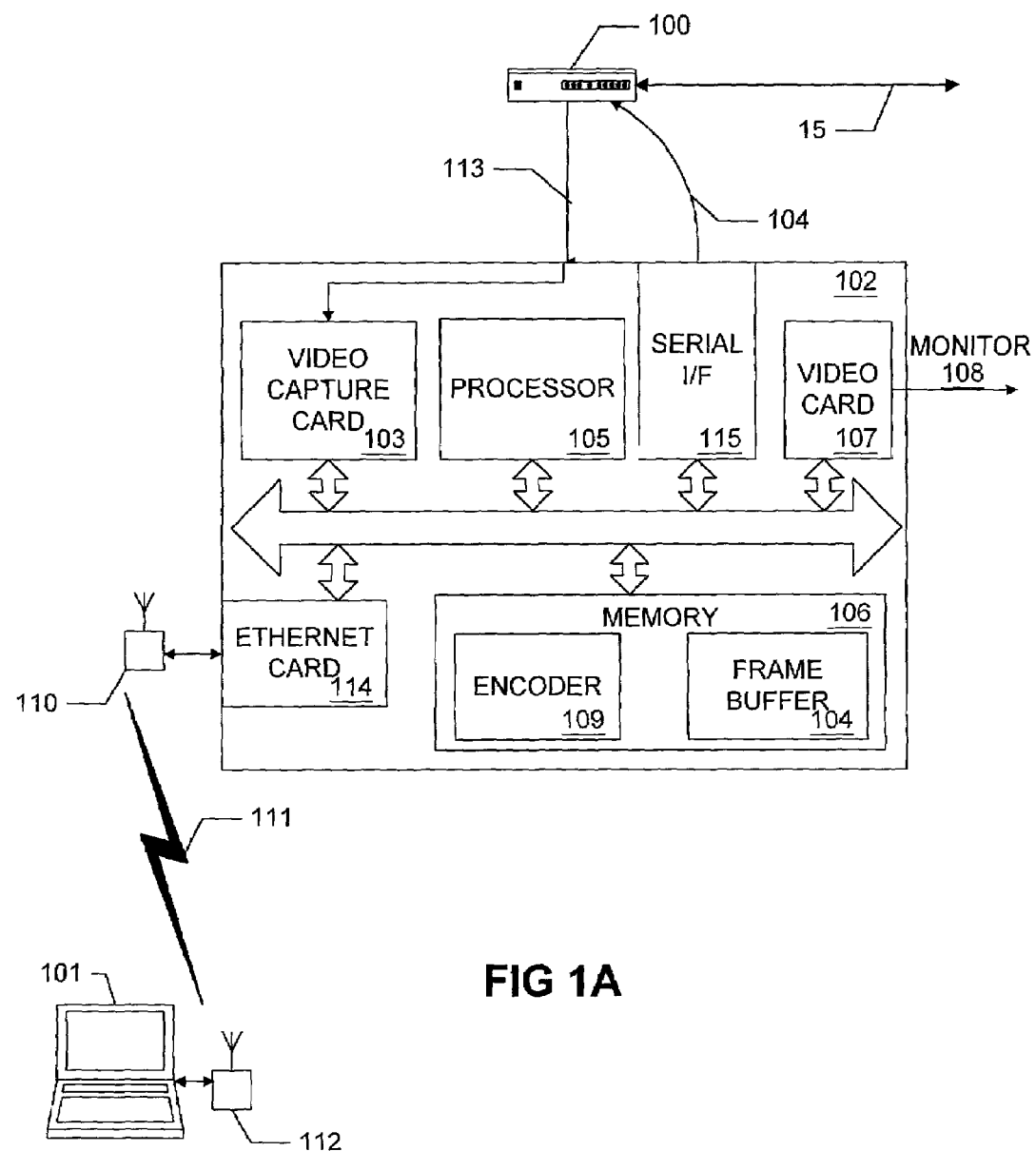
FIG. 1A is a block diagram of an embodiment of the present invention.

One embodiment of the present invention is generally implemented as a wireless network of set top boxes. Referring to FIG. 1A, one embodiment of a wireless subscriber television system can be seen. In general, this embodiment of the invention comprises a master set top box 100 that receives the multiplexed audio/video signal on connection 15 from a headend service provider 1 (FIG. 1) and outputs an audio/video television signal for communication to a remote laptop computer 101. The master set top box 100, in one example, among others, can be a relatively standard set top box (similar to that seen in FIG. 2, without the network device 110, and having a second RF driver 267 output and being configured to receive remote control commands through a serial connection), which is connected to a computer 102 through a coaxial (coax) cable 113, or other data cable, connected to the output of the master set top box 100.

The computer 102 receives the audio/video signal through a streaming video capture card 103 from the master set top box 100. One example of such a streaming video capture card is an Osprey card, available from ViewCast.com of Dallas, Tex. through its Osprey Video division based in Morrisville, N.C. The streaming video capture card 103 takes the analog input and converts it to digitized video signal. The card then draws the video signal on a frame buffer 104 of the computer 102 through the processor 105. The frame buffer 104 is located in memory 106, and the frame buffer 104 is normally written to the video card 107 for viewing on a monitor 108. This implementation, however, uses an encoder 109, stored in memory 106, to read the computer frame buffer 104 and uses the encoding software 109 to digitally compress the video signal before sending it to a network card 114. One example of a such encoding software 109 would be Microsoft Net-Meeting, which is available from Microsoft Corp. of Redmond, Wash. Further examples of such encoding software include, among others, Windows Media Player, also available from Microsoft Corp. of Redmond, Wash., and RealPlayer, available from RealNetworks, Inc., of Seattle, Wash. In this implementation the network device is an ethernet card 114 attached to an IEEE 802.11b (wireless ethernet) device 110, via an ethernet cable. The wireless ethernet device 110 may be either a peripheral device or a card installed into the computer 102.

After receiving the digitally compressed audio/video signal, the master wireless ethernet device 110 then modulates the audio/video signal and sends it over a wireless link 111 to remote wireless ethernet device 112. The remote wireless ethernet device 112 then demodulates the audio/video signal and transfers it to the laptop computer 101 through an ethernet connection to an ethernet card (not shown) in the laptop. Alternatively, the remote wireless ethernet device 112 could also act as the ethernet card and transfer the audio/video signal to the laptop 101 through a serial port or universal serial bus (USB) connection. The laptop computer 101 is a conventional laptop computer that can include a decoder, implemented in either software or hardware, and decodes the received audio/video signal and writes the decoded video to the laptop display. One skilled in the art would recognize that the remote laptop computer 101 can be replaced by numerous other viewing devices. One such example is a desktop computer which could be connected to the wireless device 112 via USB or peripheral component interconnect (PCI) buses. As one skilled in the art can further imagine, this invention is not limited to merely the IEEE 802.11b communication standard, but may be used on any wireless standard capable of transmitting video quality signals in accordance with this description, e.g. IEEE 802.11a, 802.11g, Bluetooth 2.0, HomeRF 2.0, HiperLAN/2, and Ultra-Wideband, among others, along with proprietary extensions to any of these standards. Moreover, one skilled in the art will recognize that these embodiments can also be extended to wired medium standards, replacing link 111, such as the HomePlug standard which uses existing power lines in a home to transmit a piggyback a high-frequency ethernet-type signal onto a low frequency power signal, and the HomePNA standard which uses the twisted pair wires of the telephone pre-wired into a house to pass data signals.

The master wireless ethernet device 110 is also capable of receiving control signals (e.g. remote control commands), generated by the remote laptop computer 101 in response to user input and transmitted to the master wireless ethernet device 110 by remote laptop wireless ethernet device 112. The master wireless ethernet device 110 demodulates these signals and relays them back to the master set top box 100 through the serial interface 115 via a connection 104 from the computer 102 to a serial port on the master set top box 100. The memory of the computer in this embodiment would further include software to recognize these control signals to relay them to the serial interface 115 for transmission to the master set top box 100.

The wireless ethernet devices 110, 112 described in this embodiment include devices made according to the IEEE 802.11b standard. In general, IEEE 802.11b devices for use with computers have become widely available from a variety of vendors. The IEEE 802.11b standard operates on the two lowest layers of the OSI seven layer model, the data link and physical layers.

At the physical layer lies the radio technology. The wireless ethernet devices 110, 112 operate in the 2.4 GHz Industrial, Science and Medical (ISM) band according to a direct sequence spread spectrum (DSSS) protocol. The band varies slightly internationally, but was chosen in part because it does not require licensing in the countries in which it is recognized. The DSSS divides the bandwidth into 14 22-MHz channels, all but three of the channels slightly overlapping the adjacent channels. Data is sent directly across one channel. Noise compensation is allowed through a method called "chipping," whereby each bit of data is converted into a set of redundant bit patterns, called "chips." This redundancy, along with spreading the signal out over 22 MHz, provides a sort of error checking and correction that can recover data in many instances without necessitating retransmission.

The DSSS protocol was also chosen for the 802.11b standard because of its higher transmission rate. Frequency hopping spread spectrum, used in some other 802.11 standards, is inherently limited to a bit transfer rate of around 1-2 Mbps because of FCC regulations. In comparison, the DSSS method as implemented in 802.11b is capable of about 10-11 Mbps. The increase in speed is due in part to the DSSS protocol, however, it is also due in part to the use of complementary code keying (CCK). This method consists of a set of 64 8-bit code words, whose unique mathematical properties allow them to be distinguished from each other, even in the presence of heavy noise. CCK encodes 8 bits per carrier using quadrature phase shift keying modulation and a transfer rate of 1.375 million symbols per second in order to obtain the higher data rate.

The 802.11b data link layer is comprised of two sublayers: the logical link control (LLC) and the media access control (MAC) sublayer. The LLC is the same as other 802 LANs, however, the MAC sublayer is somewhat different from those wireless standards. The MAC uses a carrier sense multiple access (CSMA) protocol much the same as in regular ethernet standards, hence the nickname, wireless ethernet. It is designed to support multiple users by having the sender sense the carrier prior to transmitting a signal.

However, collision detection (CSMA/CD), which is used in regular ethernet applications is not possible. The reason for this lies in the fact that in order to detect a collision the transmitting system must be able to listen and transmit at the same time. Radio systems cannot listen and transmit at the same time because the transmission drowns out the receiver's ability to listen.

Instead, the 802.11b standard uses collision avoidance (CSMA/CA), which attempts to avoid collisions by using packet acknowledgement (ACK). Thus, when a station wants to transmit, it first listens. If the station hears no transmissions it waits an additional random period of time, listens again, and if still no signal is present it transmits. The transmitting station then listens for an ACK. If no ACK is received, a collision is assumed, and the station again waits a random period of time before transmitting. This process continues until an ACK is received from the target destination.

The MAC sublayer also provides a request to send (RTS) and clear to send (CTS) protocol for operation. In this implementation, when the transmitting station wants to send information, it can send the access point an RTS. The access point then responds with a CTS. Since all devices within the access point's range hear the CTS signal, all other devices stop transmission. This insures that the transmitting station will be allowed to send its signal without collisions caused by transmissions from other end points.

The MAC sublayer provides two final noise resistance features: a cyclic redundancy check (CRC) and packet fragmentation. The CRC is used to detect errors in the transmission of the data by attaching a checksum to the transmission. In normal ethernet, this error checking is handled at a higher level, however, the higher likelihood of error makes the error checking more efficient at the MAC level in 802.11b. Packet fragmentation allows larger packets to be split up into numerous smaller packets. Generally, the larger the packet, the more likely an error is to have occurred during transmission. Therefore, instead of being forced to retransmit the large packing, small packets are used, such that an error in one small packet leads only to the re-transmission of that one small packet.

The final point with regard to the MAC sublayer is that it provides for a so-called point coordination function (PCF), wherein a single point controls access to the media. This is particularly important in this embodiment of the present invention because it provides a sort of quality of service with respect to time-bounded data such as voice and video. Here an access point will allow for a period of time for each station to broadcast without competition from other endpoints controlled by the access point. This allows for the system to guaranty that a signal will arrive within a certain period of time.

Figure 1B:
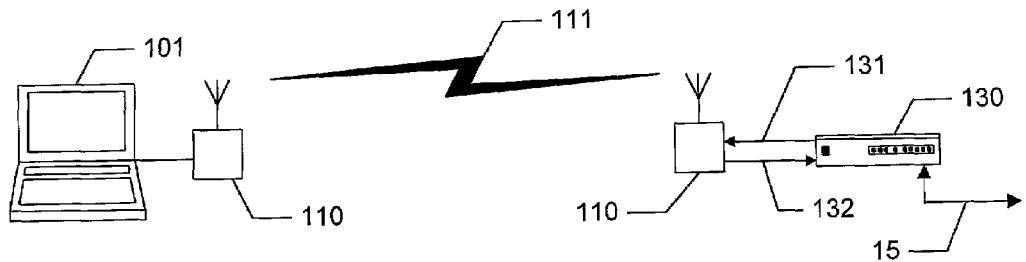
FIG. 1B is a block diagram of an alternative embodiment of the present invention.

Referring now to FIG. 1B, one can envision a second embodiment of the present invention. Here the computer 102 in FIG. 1A has been eliminated. Input signal encoding is performed inside a master set top box 130 (which is similar to 160, FIG. 2, without the wireless ethernet device, and having a second RF driver 267 output and may not have a second tuner), which converts an audio/video signal received from a headend service provider 1 into a digitally compressed audio/video signal. Alternately, the signal received on the coax cable from the headend service provider 1 could be received in a digitally compressed form, such as MPEG, in which case, there would be no need, in some implementations, for the master set top box 130 to further digitally compress the signal. The compressed digital audio/video signal from the master set top box 130 is connected through a connection 131 (such as a USB connection, among others) to a master wireless ethernet device 110. The master wireless ethernet device 110 then modulates the compressed digital audio/video signal and transmits the compressed digital audio/video signal through a wireless link 111 to a remote wireless ethernet device 112. The remote wireless ethernet device 112 then sends the signal to a remote laptop computer 101, which, through a hardware or software implementation of a decoder, decodes the compressed digital audio/video signal and sends it to the display.

Figure 1C:
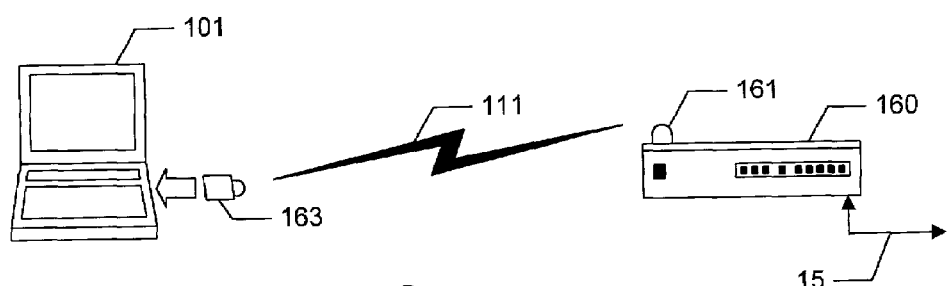
FIG. 1C is a block diagram of a second alternative embodiment of the present invention.

The remote control functions in this embodiment would operate similarly to the previous embodiment, however there would be no computer to act as intermediary, so the signals should be sent in a form that the master set top box 130 will recognize. These commands can be relayed to the master set top box 130 via connection 132, entering the master set top box through a serial port 268 (FIG. 2) for remote control commands. Referring to FIG. 1C, one can envision eliminating the separate wireless ethernet devices 110, 112 in FIG. 1B, and installing wireless ethernet, for example, capability into the set top boxes themselves. A master set top box 160 is equipped with a wireless network device which transmits the compressed digital audio/video signal via antenna 161 through a wireless link 111 to a remote wireless ethernet device 163. The remote wireless ethernet device 163 in this embodiment takes the form of a PCMCIA card, but one can also envision the full integration of wireless ethernet capability into the laptop computer 101 itself. The PCMCIA card 163, when plugged into the computer, can rapidly demodulate the audio/video signal and communicate the incoming audio/video signal to the laptop computer 101, which then decodes the compressed digital audio/video signal and sends the decoded audio/video signal to the display of the laptop 101. The result in each of these embodiments is a sequence of television pictures (video and audio) on a laptop computer. The wireless system of master and remote set top boxes 160, 170 does not necessitate that the viewing device be in close proximity to a coax cable outlet, thus creating a mobile television viewing apparatus, wherein the viewing device can be moved and carried around while viewing.

Figure 1D:
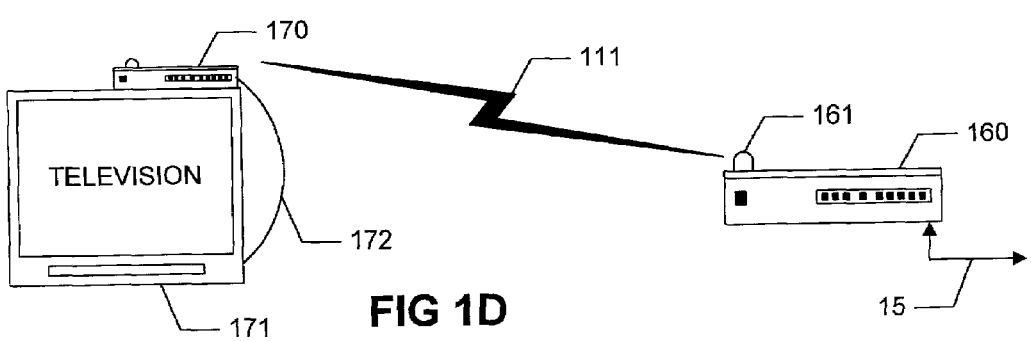
FIG. 1D is a block diagram of a third alternative embodiment of the present invention.

Referring to FIG. 1D, one can envision eliminating a household coax cable outlet in favor of a wireless link from a master set top box 160 to a remote set top box 170. The master set top box 160 receives an audio/video signal 15 from the headend service provider 1 and encodes the audio video signal, digitally compressing it, if it is received in analog form. The encoded television signal would then be sent from the master set top box 160 to the remote set top box 170, where it would travel to a television 171 via coax cable 172 connection. This embodiment would also eliminate the inferred requirement that a television be located in close proximity to a coax cable outlet, thus effectively creating a portable television viewing apparatus.

Figure 1E:
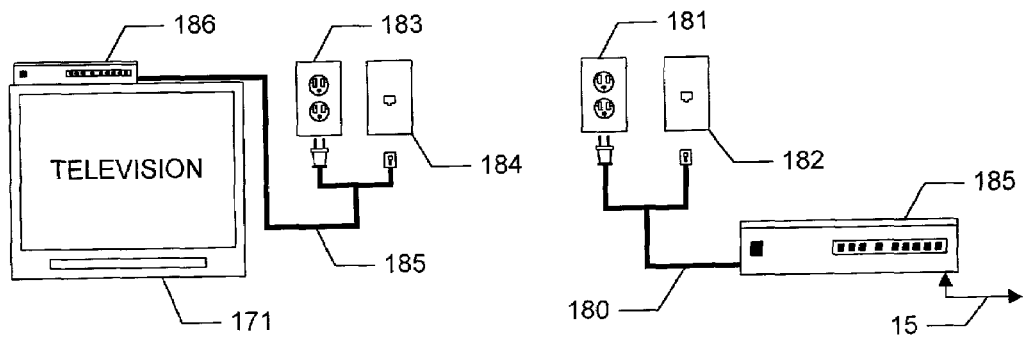
FIG. 1E is a block diagram of a fourth alternative embodiment of the present invention.

Finally, referring to FIG. 1E, shown is another embodiment of the present invention using, alternatively, the HomePlug or Home phoneline networking alliance (HomePNA) standards. The HomePlug standard, as was discussed earlier, uses pre-existing power-wires to transmit a high frequency signal from one power outlet in a home to another power outlet in a home. This enables home networking without the necessity of opening the walls of the house and putting in new network wiring. The HomePNA standard is similar in that it operates on pre-existing wires in the home, but it uses the telephone wiring instead of the power wiring. Thus, in this embodiment, the master set top box 185 receives the video input signal on connection 15 from the headend 1. The master set top 185 is configured with a network device that uses either the Home-Plug or HomePNA standard. When the network device is a HomePlug card, the master set top box will send the information through connection 180 to a normal household power outlet 181. When the network device is a HomePNA card, the master set top box will send the information through connection 180 to a phone jack. The pre-existing wiring (not shown) then carries the signal to every other like outlet in the home. When a remote set top 186 is plugged into another power outlet 183 or telephone jack 184 via connection 185, the signal can be received and demodulated by a HomePlug or HomePNA network device in the remote set top box 186, depending on which card the master set top box 185 uses. The remote set top box 186 can then send the signal to the television 171 for viewing.

Figure 2:
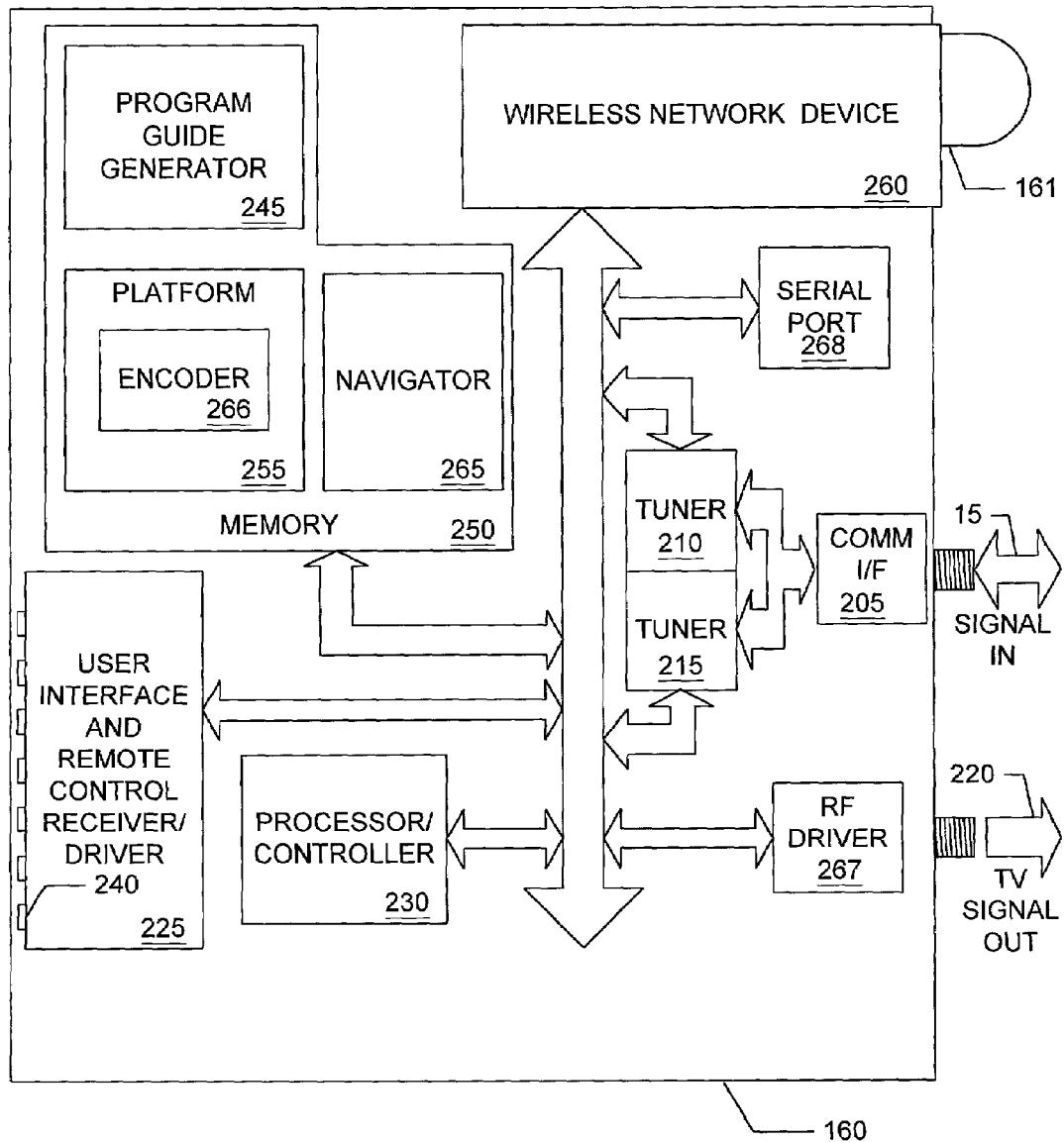
FIG. 2 is a schematic diagram of the master set top box as seen in FIG. 1C and FIG. 1D.

Referring now to FIG. 2, a block diagram of one example of the integrated master set top box 160 of the wireless system can be seen. First, a cable signal 15 from the headend service provider 1 is introduced into the master set top box 160 through a communications interface 205 that can, preferably, direct data in both directions, to and from, the headend service provider 1. The incoming cable signal 15 arrives at a tuner 210, which filters out the unwanted source signals (i.e. television stations/programs or channels) and tunes to a selected television signal, decoding and/or de-scrambling the television signal coming into the master set top box 160, as necessary. In some embodiments the tuner 210 will also include a demultiplexor because the tuned signal actually contains several different "programs," or television signals, multiplexed into the same tuned program stream. A demultiplexor would select the particular station, or television signal, from the channel or program stream that has been tuned.

The master set top box 160 can also include a second tuner 215, such that the master set top box can also transmit an independent signal 220 to a co-located viewing device (e.g. a television), through an RF driver 267. In the case where the master set top box 160 includes a second tuner 215, it can also include an infrared receiver/driver 225, which controls the second tuner 215 through the controller 230. Another embodiment, among others, includes only one tuner 210, an RF driver 267, and an infrared user interface 225 for a remote control, such that the co-located viewing device and remote device receive versions of the same television signal.

The output of the tuner 210 typically goes through an encoder 266, which is, in one implementation, a program residing in memory 250 and running on the platform 255. Alternately, the encoder 266 could be a hardware package installed into the master set top box 160. A hardware package, such as an application specific integrated circuit (ASIC), would likely provide a more high speed solution to the encoder, but would raise costs. When the signal received from the headend service provider 1 is analog, the controller would instruct the encoder 266 to convert the tuned signal to a compressed digital signal that can be transmitted via any of the wireless standards mentioned above. Otherwise, the controller instructs the window manager application to merely write a tuned signal to the wireless interface 260 because the encoding is already present.

In the current embodiment, Microsoft NetMeeting software, executing in memory 250 and 315, is used as the encoder 266 to facilitate the transfer of the video signal. Microsoft NetMeeting uses H.263 encoding, but many other forms of digital compression exist. A few of them easily identifiable are H.323, H.324, MPEG-1, low bit-rate MPEG-2, MPEG-2 and MPEG-4, each of which could be substituted for the H.263 digital compression, but may not achieve the same low latency result achieved in the present embodiment without some modification consistent with the teachings herein.

Video compression is used because of the limited bandwidth in a wireless link. The data rate needed to transfer MPEG-2 video is approximately 4 Mbps at the low end. By compressing the data, one can send more data across the link over the same period of time, effectively increasing the data transfer rate. However, in the current implementation using the H.263 compression technology the data transfer rate is approximately 1.5 Mbps, considerably lower than MPEG. Consequently the video quality is limited at the remote viewing device, because the same video stream is transferred using less bandwidth. However, wireless links such as 802.11a make high data compression ratios less important, possibly eliminating the need for high compression ratios completely. However, as will be discussed later, the H.263 standard still may be as good of a solution as any with regard to low latency, when changing the channel or requesting the program guide from the master set top box. Alternately, a low bit-rate MPEG-2 encoder could also fulfill the need for low latency at the remote viewing device.

The H.263 standard as used in this application was developed by the International Telecommunications Union. The first means of compression used in H.263 is motion compensation. Motion compensation works for translational motion (i.e. items travelling across the picture, or camera panning), not for zooming or rotational motion within a picture. Compression is achieved here by transferring only a motion vector rather than transferring the pixel values for the entire picture. However, rather than remaining static, more often there is an error between the frame predicted using only motion vectors and the actual frame. Here a discrete cosine transform method is used to encode the translational errors. This error signal is then sent to the receiving end to enhance the picture received.

The H.263 standard also uses the discrete cosine transform (DCT) to compress the image. In the H.263 standard, a two-dimensional DCT is applied to 8×8 blocks of pixels in the image to be compressed. The coefficients that are achieved are then quantized. This quantization is where the compression actually takes place. Many of the coefficients are very small, and thus become zeros after being quantized. Moreover, the larger DCT coefficients correlate to higher frequency signals. The human eye, however, is less sensitive to high frequency deviations, and therefore, a high quantization factor can be used on these coefficients without sacrificing much in terms of video quality. Thus a large DCT coefficient can effectively be made smaller in order to achieve a higher compression ratio.

The H.263 standard then uses run length encoding to compress the quantized DCT coefficients. Run length encoding encodes a series of consecutive pixels containing the same color as a single codeword. For example, if a series of data contained twelve zeros, the runlength encoding would merely transfer something such as "12 0", rather than transferring twelve separate zeros, "000000000000." Clearly the first method of transferring the number of repeaters and the number repeated takes up less bandwidth than transferring the whole series of numbers. Thus, the compression ratio can be fairly high in situations where there are like color pixels located adjacent to one another.

While the H.263 method is a good standard for achieving high video compression ratios, there are many better standards with respect to video quality. For the most part, consumers have been satisfied with seeing low quality video in the video conferencing software area, which is why videoconferencing tools are designed for low bit rate and low latency. However, the same consumers are not likely to be so willing to settle for low quality video with respect to the entertainment area in general, and television especially. Recent evidence of consumer demand for high quality video can be seen in the unprecedented rate of acceptance of DVD as the standard in home entertainment systems. Thus higher quality standards like MPEG-1, 2 and 4, along with H.323, H.324 may eventually replace H.263 in the present embodiment.

However, the drawback to replacing H.263 is that the other compression standards use more complicated algorithms that delay the transmission of a new signal from the source. Thus, when the user changes a channel, he/she may not see the effect of the channel change for a few seconds, until the new signal has had a chance to be compressed, transmitted, received and decompressed. High latency in the program change response time is otherwise concerning, and the H.263 solution limits the latency between a requested channel change, program guide or any other request to less than two or three seconds, and preferably to less than one-half second.

The H.263 standard has low latency and, as such, may still be an ideal solution to the latency problem. In an effort to address both the problem of picture quality and the problem with picture latency, an encoder is included in the preferred embodiment that would employ both an H.263 standard and a higher quality standard. MPEG may be the ideal standard for such a situation since it uses the same compression algorithms as H.263. In one sense, H.263 is a lower quality version of the MPEG compression standard.

Alternatively, one skilled in the art would recognize that a low bit-rate MPEG-2 signal could be used in place of the H.263 encoder. The low bit-rate MPEG-2 signal would be encoded such that there was low latency, in the range of less than a second, between the reception of a user input and the changed signal arriving at a viewing device.

Recognizing this, the encoder 266 at the master set top box could start sending the information immediately, or as soon as a low quality H.263 or low bit-rate MPEG-2 signal could be ready to send. Then, in one embodiment, as the system becomes ready to compress at a higher quality the signal received from the headend service provider 1, the master set top box 160 could start changing the encoding parameters to increase quality. Other embodiments include maintaining the lower quality video compression.

As these encoding parameters are changed, it may be necessary to include a flag in the transmission. The flag would include an information signal containing the proper decoding parameters, such that a decoder in the receiving device 101, 163, 170, 186 could properly decode the signal. This information signal could be included in a header packet, out-of-band data packet, or any other location where it might be possible to include overhead information to be sent to the receiving device. Such a flag could comprise a predetermined bit pattern of sufficient length, followed by the parameters used to decode a certain audio/video packet received, and ending with the same predetermined bit pattern. Since the video bit rate is typically lower than the channel capacity, there is extra bandwidth left over for this type of information. Alternatively, the decoder at the receiving device may include some sort of digital signal processor algorithm that recognizes the digital encoding parameters of the sent signal and decodes the signal accordingly.

One can envision many different possible alternatives to the embodiment disclosed above. One possible option could include two different audio/video signals that are simultaneously transmitted to the remote set top box (or other receiving device) on different frequency, time-division, or code-division channels, depending upon the system. The controller at the remote set top box would decide to show the H.263 or low bit-rate MPEG-2 signal for a period of time immediately following a change of channel or other request. Then, at some point in time, after the higher quality video signal has finished encoding and started transmitting, the controller at the remote set top box could then splice together the higher quality signal into the lower quality signal. This splicing would occur after the decoding of the audio/video signal, and gradually the lower quality signal would be removed, leaving only the high quality signal to be displayed.

Another method that can be envisioned could use a process whereby a single high quality compression signal is created and transmitted. However, since the encoder 266 and decoder of the high quality compression will take more time from the total time budget, time must be cut from the budget in other places. The most effective location to cut time use is in a decoder input buffer (not shown). The input buffer might be completely eliminated immediately after a user input. Thus, the delay associated with the input buffer is reduced. While the signal is being immediately transferred to the screen, the input buffer can be reinstated, removing its susceptibility to the jitter problems normally associated with small input buffers. One or more of these methods may be used in solutions to the need for low latency in a distribution system.

A further option would exist where the video input signal on connection 15 from the headend service provider is already MPEG-2 encoded. In this environment, the master set top box 160 could pass the signal directly to the wireless network device 260 after tuning 210. Alternatively, the master set top box could re-encode the video input signal after tuning to a lower bit-rate encoding format. The lower bit-rate encoding format could take the form of either H.263 or a low-bit-rate version of MPEG-2, among others. Either of these methods, among others, can transfer the audio/video signal to the remote set top box 170.

After digitizing and compressing the data, the encoder 266 residing on the platform 255 then preferably sends the encoded signal to an optional encryption device (not shown) also residing in memory 250, running on the platform 255. The encryption device is used so that the communications of the television signal cannot be intercepted and bootlegged without permission. Many encryption systems can be used, an acceptable example of which is discussed in U.S. Pat. No. 6,157,719, filed Jul. 31, 1998, entitled Conditional Access System, which is hereby incorporated by reference.

After the encryption, the controller 230 sends the audio/video signal to the wireless ethernet module 260, which is preferably capable of transferring up to 10 Mbps. Alternatively, this module can also be a fast wireless ethernet (IEEE 802.11a) module capable of transferring up to 54 Mbps, an IEEE 802.11g module capable of transferring over 20 Mbps, a Bluetooth 2.0 module capable of transferring up to 10 Mbps, a HomeRF 2.0 module capable of transferring up to 10 Mbps, an Ultra-Wideband module, or any other network device designed to transmit video quality signals (i.e. greater than about 4-5 Mbps). The wireless ethernet module 260 modulates the signal and sends it through antenna 161 to remote set top box 170.

Controller 230 can also be configured to receive control signals from the remote set top box through a wireless interface 260 in the master set top box 160. Another method for a user to enter commands is the user interface 225, which allows the user to control the master set top box 160 with buttons 240 on the front of the set top box. The functionality for the remote control located at the remote set top box is discussed in more detail below.

Another feature that can be added to the present embodiment is an interactive program guide. When present, program guide generator 245 is preferably an application that resides in memory 250 that can generate the interactive program guide output for a co-located television or viewing device. Moreover, in one embodiment the program guide generator 245, generates the program guide for the remote set top box viewing device as well as for the master set top box 160. When a user command is received at the controller 230 requesting the program guide, the controller 230 can use the program guide application 245 with an associated program information database (not shown) residing in the memory 250 to generate the program guide output and instruct a window manager application (also residing in memory and running on a platform 255) to write the signal to the viewing device.

The program guide generator 245, preferably, works by receiving a broadcast file system (BFS) signal from the headend service provider 1 that continuously updates the database in the program guide generator 245. It does this according to a sort of carousel method, continuously providing program information over and over again. When a set top box wants to get particular information, it waits until the particular information comes around on the carousel BFS signal, and then downloads the information. As one skilled in the art will recognize, alternatively, instead of passing the program guide as an image representation to the remote set top box 170, the system could be configured to pass only the contents of the program information database to the remote set top box 170, thus saving bandwidth. Further bandwidth savings can be achieved by transmitting only a portion of the program information database, as needed by a user of the remote set top box 170. Of course, in either case, remote set top box 170 would run an application to interpret and display the interactive program guide.

Figure 2A:
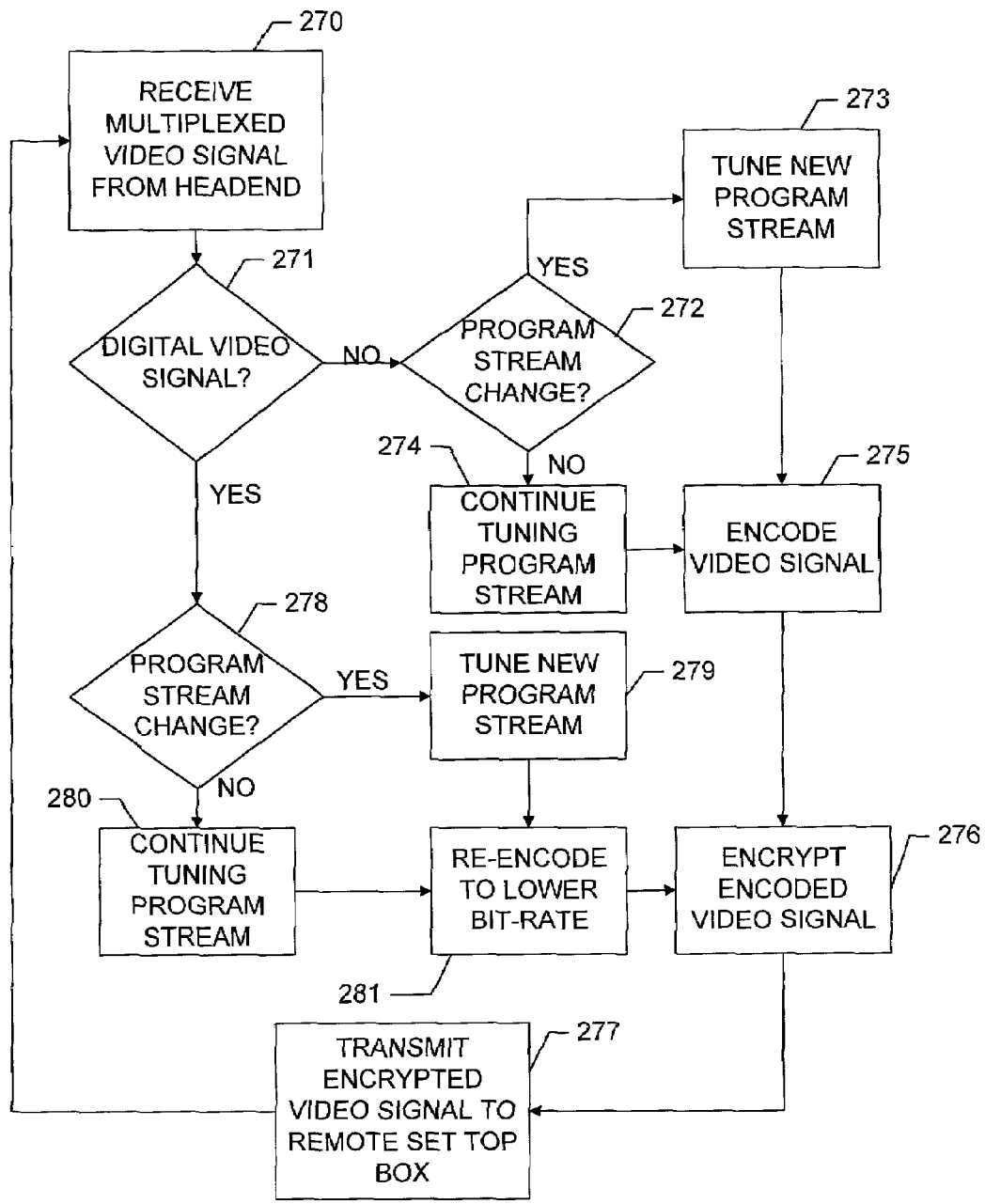
FIG. 2A is a flowchart illustrating the operation of the master set top box as seen in FIG. 2.

Referring now to FIG. 2A, shown is a flowchart further illustrating the operation of the master set top box 160 (FIG. 1D). First, the master set top box 160 receives a multiplexed video signal 270 from the headend service provider 1 (FIG. 1). The master set top box then determines whether or not the video input signal corresponding to the currently tuned television programming (media content instance) is a digital signal 271. If the signal is not a digital signal, the flowchart illustrates that the master set top box 160 senses whether or not a program stream change has been selected 272. If there has been a program stream change, the tuner 160 tunes a new station 273, otherwise the tuner continues tuning the same program stream 274. Next, the video signal is encoded 275. If the encoding occurs soon after a program stream change, in some embodiments the encoder encodes the signal in a low quality video format. After, a period of time without a channel change, or a period allowing a higher quality video signal to be encoded, the signal is encoded in the higher quality format. After encoding the video signal, the signal is optionally encrypted 276, depending on the embodiment. Finally, the signal is transmitted 277, and the process starts over again. Returning to the digital video signal test 271, the master set top box 160 tests whether there has been a program stream change 278. If there has been a program stream change, the new program stream is tuned 279, otherwise, the master set top box continues tuning the same program stream 280. The digital signal is then optionally encrypted 276 and/or re-encoded to a lower bit-rate encoding 281, depending upon the embodiment, and transmitted to the remote set top box 277. In other words, one or both of steps 276 and 281 are omitted in some embodiments. Furthermore, the steps of the process of FIG. 2A may be combined or altered in other embodiments to accomplish one or more of the functions described above.

Figure 3:
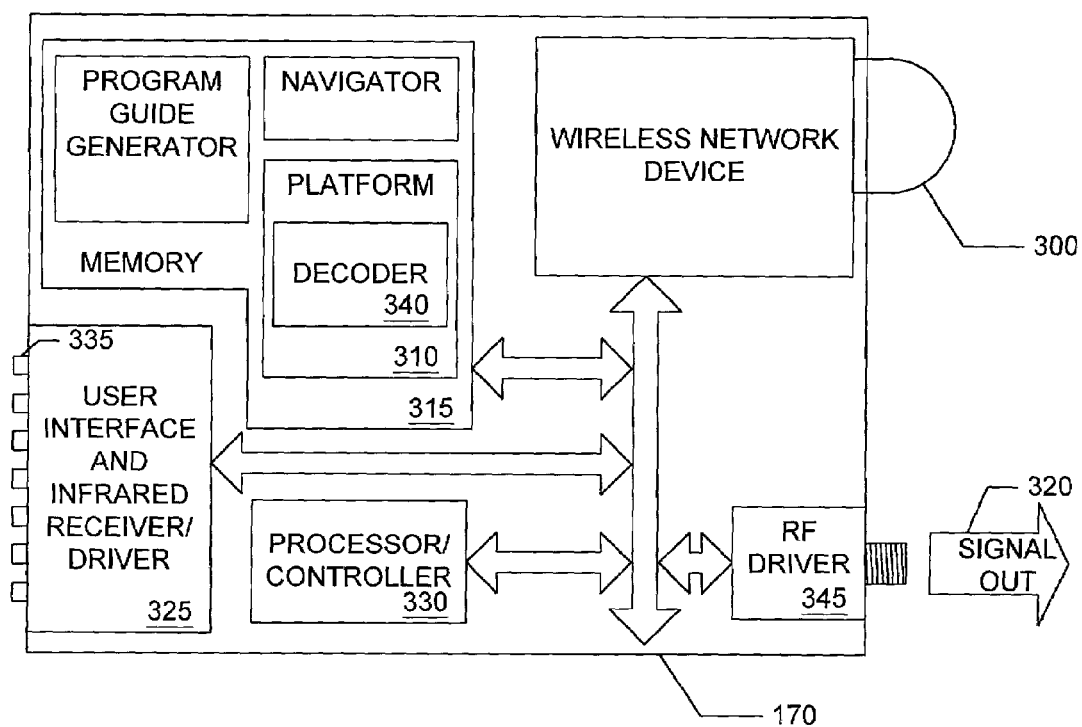
FIG. 3 is a schematic diagram of the remote set top box as seen in FIG. 1D.

Referring now to FIG. 3, the remote set top box 170 receives the wireless signal through antenna 300, which in the case of a wireline transmission system would be a communications interface. The wireless ethernet device 305 then demodulates the signal such that the output of the wireless ethernet device 305 is essentially a duplication of the input signal at the wireless ethernet interface 260 (FIG. 2) of the master set top box 160. The output signal from the wireless ethernet interface 305 can then be de-scrambled, if it was scrambled at the master set top box 160. After de-scrambling, the signal is then able to be decoded 340. Each of these functions reside on the platform 310 in memory 315, but could also be implemented in hardware.

The decoder 340 can be used in any of three ways, according to the viewing device attached. The first embodiment converts the compressed digital signal into an analog audio/video signal. The second embodiment of the decoder 340 exists in the event that the remote viewing device is a digital viewer without decompression capability. Finally, there is the case where the remote viewing device comprises the capability to handle digitally compressed audio/video signals such as H.263, H.323, H.324, etc.

The first embodiment is used when the remote viewing device is an analog viewing device, such as a standard television. In such a situation a window manager (not shown), residing in memory 315, will output a radio frequency (RF) signal to the coaxial connection 320, leading to the television set, after the decoder decompresses the received compressed digital television signal.

In the embodiment where the remote viewing device is digital, but contains no software allowing the device to view compressed digital video, the signal is merely decompressed. The decompressed digital signal is sent to the viewing device through coax connection 320, which can alternatively be an RCA connection, or any other baseband signal transference device. The coax connection 320 is driven by RF driver 345 where the signal can be processed and sent to a monitor, typically via a high-rate connector such as a video graphics array (VGA) connector or digital video interface (DVI) connector. Alternatively, the digital viewing device, such as an LCD, for example, can be driven directly by the digital signal without an intervening connector.

Finally, in the case where the remote viewing device is a device such as a properly configured laptop computer, and the wireless ethernet device is merely a PCMCIA card with no decoding capability, the signal can be merely sent to the processor of the laptop computer. The processor then uses algorithms stored in memory to decompress the signal, and sends the decompressed digital signal to the video card to be displayed. Alternatively, a hardware playback add-on card which could be used to display the compressed digital data could be used. The add-on card handles decompression without using the processor to perform the decompression. The card delivers full-screen, full-motion, full-color and CD-quality audio at the full National Television Standards Committee (NTSC) video frame rate of 30 frames per second. Hardware playback is generally of much higher quality than the software playback seen using the laptop computer. In another alternative embodiment, a PCMCIA card could provide decompression of the encoded signal with the same advantages of the hardware playback add-on.

The remote set top box 170 may also include an infrared receiver/driver 325. The infrared receiver/driver 325 can be used to receive infrared signals from a remote control device and transfer them to the processor/controller 330. The processor/controller 330 then converts the user input into a control signal. The processor/controller 330 relays these control signals to the wireless ethernet device 305, which in turn sends them to the master set top box 160 (FIG. 2) in order to change the program stream. Alternatively, the processor/controller 330 can also receive user input from the user interface 325. The user interface 325, senses a user input through buttons 335 on the front of the set top box in some embodiments. In alternative embodiments, the user interface could take the form of a keyboard, a mouse or a touch screen, among others, of a laptop or desktop computer, with slight modifications to the user interface 325.

In an alternative embodiment, the remote itself could contain a wireless device transmitting directly to the master set top box 160 (FIG. 2) in order to change the program stream. In this embodiment the user input might never be sensed at the remote set top box. Instead, a transceiver in the remote control would communicate with the wireless device at the master set top box, rather than relaying the information through the remote set top box.

In the embodiment where the viewing device is a laptop computer, most of these functions can be performed by a software package residing on the computer. For example, as mentioned above, most computers already contain decoding software 340 in memory 315 which allows the user to view video on the laptop computer, a few such example being Microsoft NetMeeting and Windows Media Player available from Microsoft of Redmond, Wash., and Real Player, available from RealNetworks, Inc. of Seattle, Wash. The de-scrambler and user interface 325 can also be embodied in a software solution on the computer, while the controller 330 function can be performed by the processor. One function that is not often replicated by a laptop is the wireless communication device 305. Conceivably, a wireless communication device 305 could be built into hardware in the computer, but generally is not currently available in many laptops. Thus, a wireless communication device 305 would probably have to be added through a peripheral device or PCMCIA card as disclosed in FIGS. 1A, 1B, and 1C.

Figure 3A:
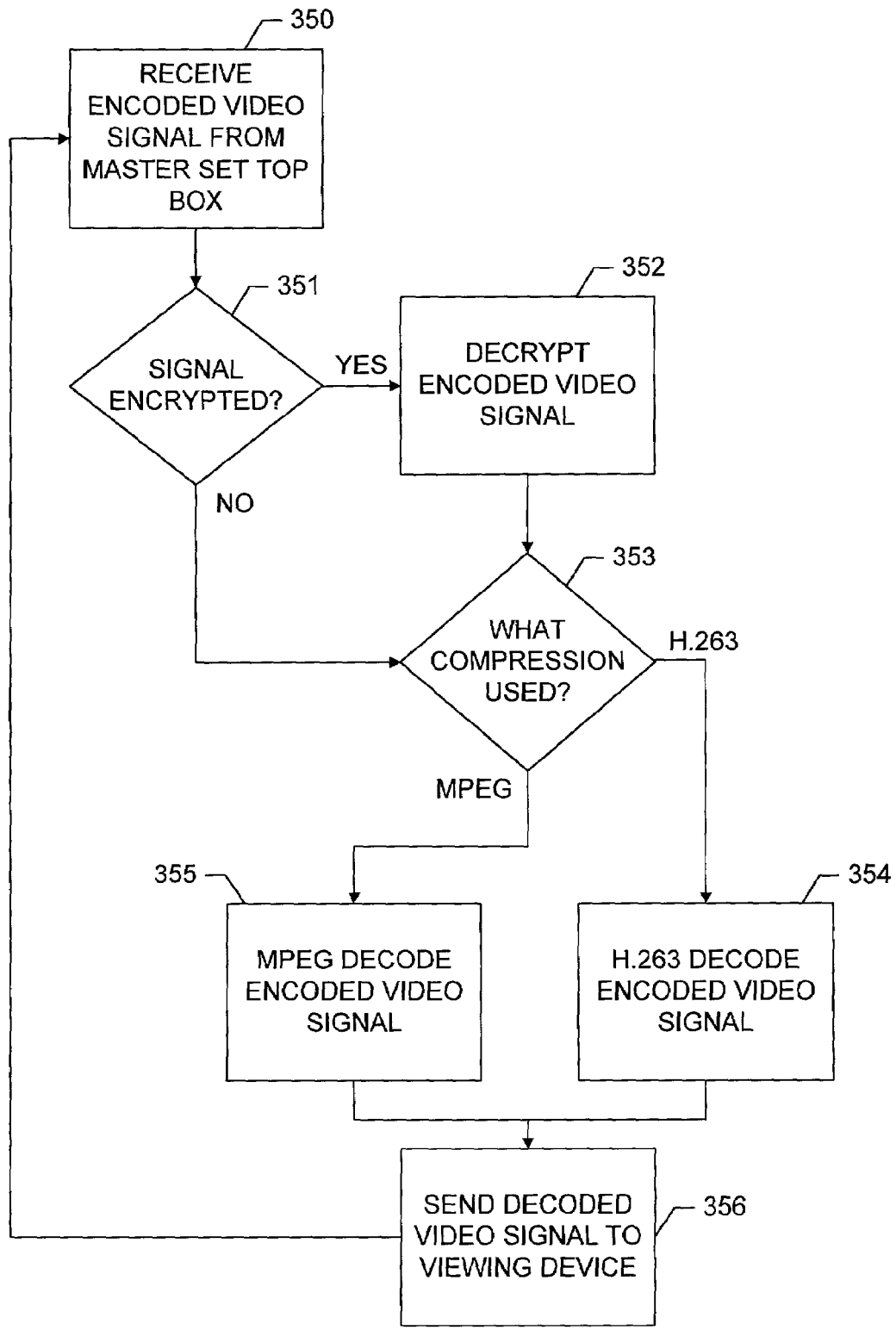
FIG. 3A is a flowchart illustrating the operation of the remote set top box as seen in FIG. 3.

Referring now to FIG. 3A, shown is a flowchart further illustrating the operation of the remote set top box 170 (FIG. 3). First, the remote set top box 170 receives 350 the encoded signal from the master set top box 160. Then, the signal is tested to see whether it has been encrypted 351. If the signal has been encrypted, it is decrypted 352. Then the signal tested again to determine what type of encoding was used to encode the signal 353 at the master set top box 160. In alternate embodiments, more than one type of encoding is used in order to achieve both low latency and high quality video, thus a choice is illustrated as H.263 encoding or MPEG encoding, though it should be understood that the choice could be among other formats as well. If the signal has been H.263 encoded, the signal is decoded according to the H.263 algorithm 354. If the signal has been MPEG encoded, the signal is decoded according to the MPEG algorithm 355. The signal is then sent to the viewing device 356, and the process starts over again.

Figure 4:
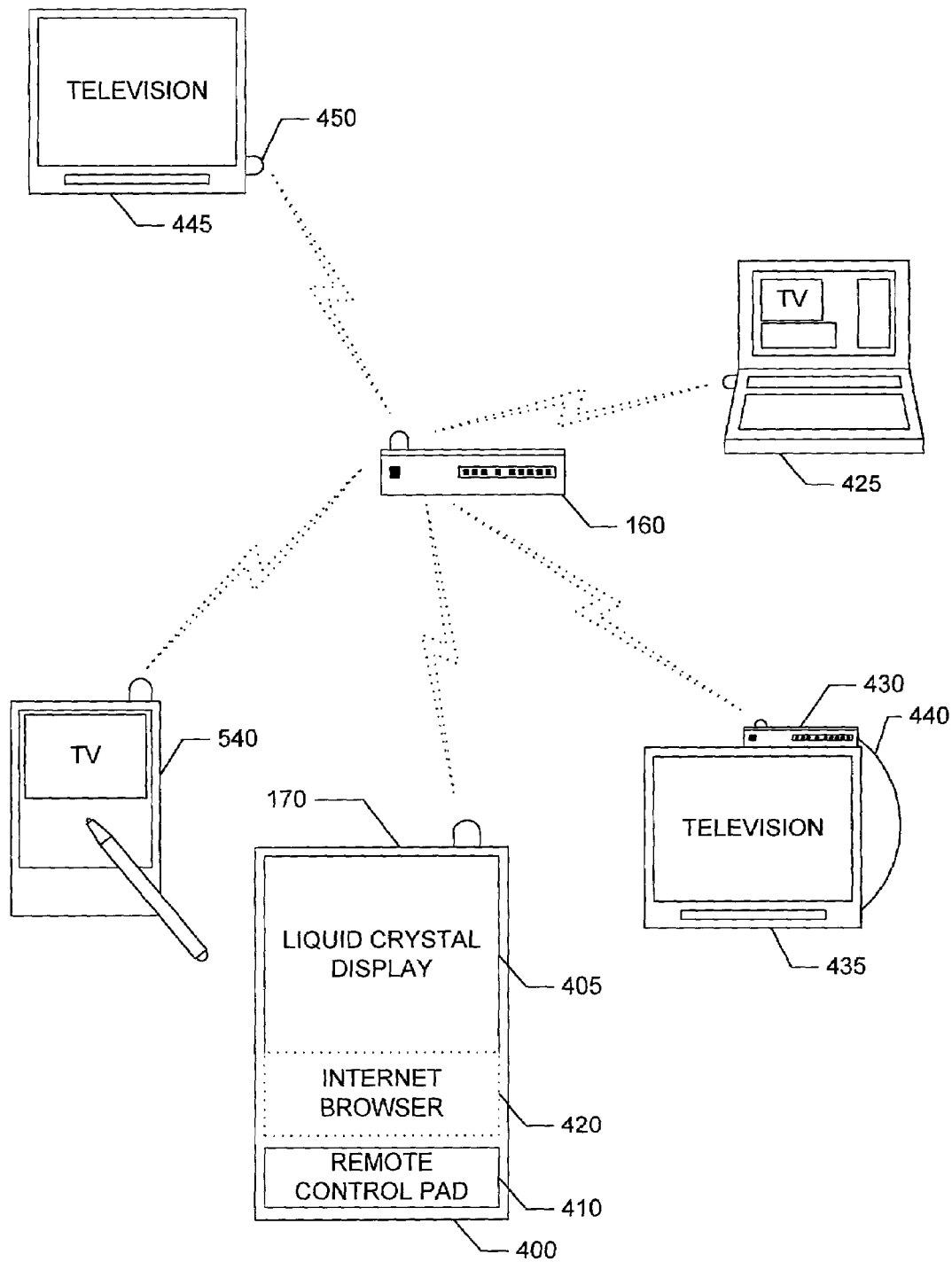
FIG. 4 is a block diagram illustrating the devices that could house the remote set top box, among others.

Referring now to FIG. 4, several alternate embodiments of the present system are represented in FIG. 4. Some functionality of the remote set top box 170 is embedded in a TV pad viewing device 400 with a liquid crystal display (LCD) 405. In this configuration the infrared receiver/driver 325 (FIG. 3) is not included in the remote set top box 170 (FIG. 3). Because the remote set top box 170 is built-in to the structure of a completely mobile viewing device 400, there is less need for a separate remote control, although one may be added with minimal alteration of the TV pad viewing device 400.

Instead, remote control software 410 is imbedded into the TV pad viewing device 400 along with the remote set top box 170. The functionality of the remote control software 410 will be discussed later in this application. The remote control software 410 commands can either be sent straight to the wireless ethernet device 305 (FIG. 3) to be relayed to the master set top box 160, or they may be sent to the controller 330 (FIG. 3) where a control signal can be created and passed along to the wireless ethernet device 305 (FIG. 3). When the master set top box 160 receives the control signal, the wireless ethernet device 260 (FIG. 2) passes the control signal on to the controller 230 (FIG. 2). The controller 230 using the navigator 265 then relays the control signal to the appropriate device, usually the tuner 210 (FIG. 2), if a channel change is requested, for example. The tuner will then change the tuned program stream in response to the control signal. Likewise, when a user requests other settings changes, the controller effects these changes through the function implied, such as changing the volume, which may be handled directly by the viewing device 400, or initiating an interactive program guide, which could be generated by the master set top box 160 or directly by the viewing device 400 executing the alternate remote set top box 170 functionality, as discussed above.

Another aspect of one embodiment of the invention that can be discussed with reference to the TV Pad embodiment in FIG. 4 is the internet browsing capability 420. This capability can be added to any of the remote set top box embodiments, but is displayed here on a TV pad viewing device 400. Internet browser software 420 is added to the viewing device and has the capability of showing a website along with the television program currently being tuned, thus using the same wired or wireless network for video and internet data.

Internet connectivity is added to the remote set top box in one of several ways. First, the internet connection can be handled by the master set top box 160 (FIG. 1D). The master set top box 160 in that case could contain a cable modem, a standard analog modem, a digital subscriber line (DSL) modem, integrated services digital network (ISDN) modem, an ethernet connection, or any other suitable connection. In this embodiment, the internet browser 420 could be run on the master set top box 160, in which case the signal sent across the link would be the entire picture including the browser.

Alternatively, the internet browser software 420 could be run on the remote set top box. Running the browser software 420 at the remote set top box would reduce the bandwidth necessary to add internet connectivity to the system. Moreover, in some embodiments the remote set top box is housed in a laptop, which would likely already have internet browser software 420 installed.

Another way to add internet connectivity is through the remote set top box functionality. The same methods for connecting the master set top box 160 to the internet can be used to connect the remote set top box 170 to the internet (i.e. cable modem, analog modem, DSL, etc.). A drawback to this method however, might be a reduction in mobility/portability of the remote set top box 170. However, the reduction in mobility can be counteracted by using wireless modems, which are now widely available, to connect to an internet service provider (ISP).

Another way to give the system internet connectivity is through the remote viewing device 400. In this embodiment, the remote viewing device 400 takes care of the protocol necessary to connect the device to the internet and also has the processing power to run the internet browser 420. The advantage of this method is a reduction in the complexity of the set top boxes 160 and 170, which results in lower costs and allows the user to decide what sort of internet connection is necessary.

Another aspect of one embodiment of the invention to be discussed with reference to the TV Pad 400 is the remote control operation. The screen remote control (remote control pad 410 in FIG. 4) operates substantially differently than an infrared remote and will be discussed in more detail here. In a normal infrared remote control, when a button is pressed, the remote may repeat the command many times until the button is released. Thus a normal set top box will continue to scroll until there are no longer any key-press signals. This mechanism helps to assure that at least one of the control signals sent by the remote will reach the sensor at the set top box, as well a continue scrolling function.

However, in this embodiment of a screen remote control, the user interface 335 may recognize two events based upon the user's actions that will be embodied in the control signal. If, for example, the user presses the channel up button, the first event will be the button being depressed, which will be sensed by the user interface. Then the user interface 335 will create a "channel up pressed" control signal. The "channel up pressed" control signal is then sent to the master set top box 160. The second event recognized by the user interface occurs when the user releases the button after some period of time. This event will cause the user interface to create a "channel up released" control signal. This event control signal is then sent to the master set top box 160.

In a conventional infrared remote, this configuration would not be very effective, since there is no guarantee that the "channel up released" signal would be sensed at the set top box. Thus with that configuration, the set top box would continue to scroll through program streams indefinitely until it receives a release signal. However, since the protocol used for almost all forms of networking creates an acknowledgment of the receipt of the signal, the "release" signal is more likely to eventually reach the master set top box 160 in this embodiment. Thus, the master set top box 160 will not continue to scroll through program streams indefinitely after the button has been released.

Referring now to the reception of the remote commands at the master set top box 160. First, the master set top box 160 senses whether or not a control signal has been received from the remote set top box 170. Then, after the signals are received by the master set top box 160, the master set top box 160 sends them to the navigator 265 through the controller 230 asking that the command be performed or passed on to an application, such as a watchTV application. The function requested most often is a channel change, although the remote control can contain a plurality of other commands such as, for example, among others, volume change, program guide request, "Pizza on Demand", menu request, etc. In the case where the function is a channel change, the controller 230 would in turn cause the first tuner 210 to perform a channel change by tuning the program stream requested. Additionally, if no "button released" signal is received at the master set top box 160 for a period of time after a "button pressed" signal is received, the navigator 265 will decide that the user intends to signal a second remote operation corresponding to the first command, and perform the operation accordingly. The navigator 265 continues making this decision to repeat until the button is finally released, and the button-release message is received.

In interpreting the word "button" used in regard to the remote control, a person skilled in the art would recognize that there is no requirement that the "button" be a physical button. Rather, the "button" can be an screen button, such as a touch screen button or a button clickable by a mouse, or any other structure that can sense a user input. Furthermore, it should be clear to one skilled in the art that a normal infrared remote can be used in conjunction with the electronic remote in relaying the infrared signal in the same manner as described above. This can be accomplished through the attachment of an infrared sensor at the remote set top box with almost identical characteristics.

Another embodiment of the remote set top box shown in FIG. 4 is the laptop computer 425. This embodiment was discussed earlier with respect to FIG. 1C. Again, the master set top box 160 communicates with the laptop computer 425 through a network communication device. Here, the network communications device is a PCMCIA card 163 (FIG. 1C) installed in the laptop 425. The laptop computer takes care of the other functions seen on remote set top boxes in other embodiments.

A third embodiment of the remote set top box (also shown in FIG. 1D) involves reconfiguring an existing remote set top box 430 so that it may receive network communications from a master set top box 160. The remote set top box 430 is then connected to the television 435 via a coax cable 440. Thus, a television 435 is no longer required to be located near a cable outlet, so the television is now a portable viewing device in that it can be placed without regard for where the cable outlet is located, and, in some embodiments, can moved without disrupting the cable programming. Moreover, many of the electronics (the tuner, for example) and applications are no longer necessary elements of the remote set top box 430.

A fourth embodiment of the remote set top box 170 is merely an extension of the previous embodiment. Here the remote set top box 170 is an element of a television 445. The remote television 445 acts as both the viewing device and the remote set top box 170, receiving the signals from the master set top box 160 through a small antenna 450.

A fifth embodiment of the remote set top box shown is a personal digital assistant (PDA) 455. The PDA 455 is similar to the TV pad 400 in that they are both comprised of an LCD as the viewing device. One difference between the PDA 455 and the TV pad 400 is that the TV pad 400 is manufactured specifically for watching television, while the PDA 455 is manufactured to be used for multiple purposes. Because of their multipurpose background, most PDAs 455 come equipped with an expansion slot, such that different cards may be inserted to give the PDA 455 alternate functionality. Here, the PDA 455 is equipped with a remote set top box expansion card which allows it to communicate with the master set top box 160.

Figure 5:
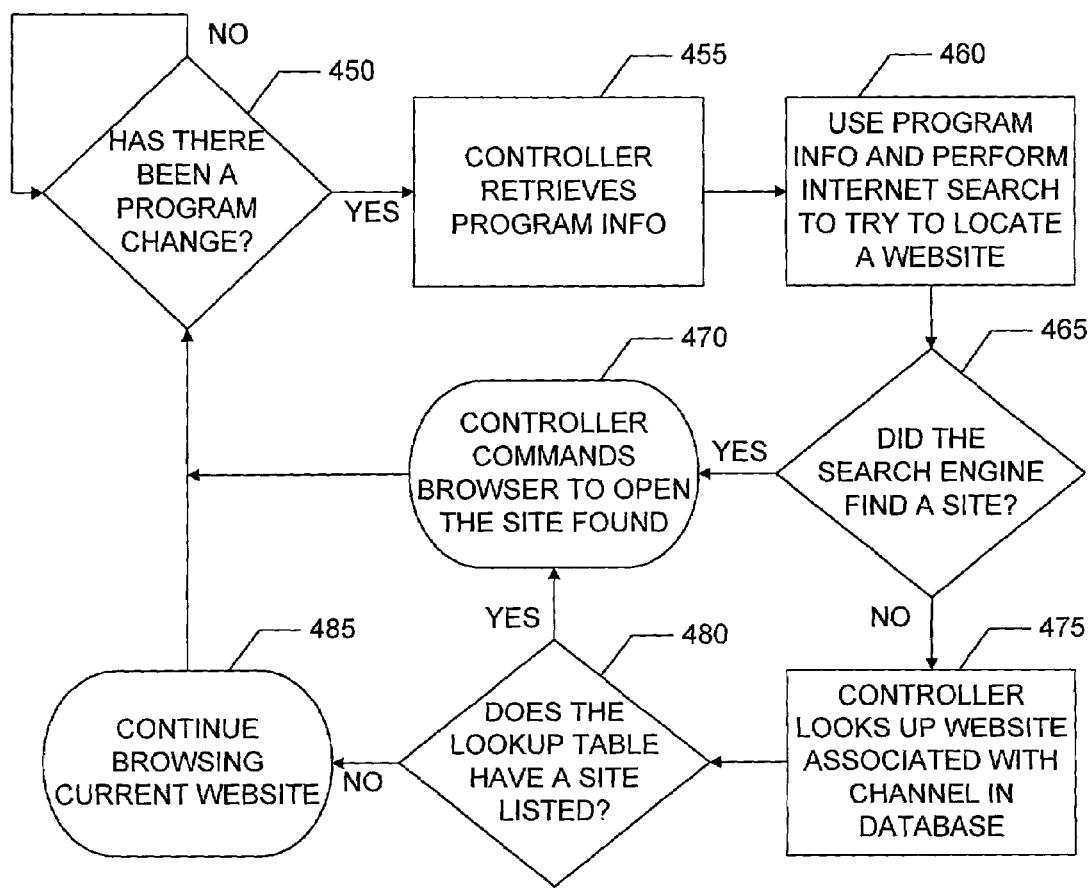
FIG. 5 is a flowchart illustrating the operation of the linking between the internet browser and the television viewer.

Referring now to FIG. 5, a flowchart illustrating a link between the internet browser and the program being watched is shown. This is a further variation of an embodiment of the present invention which involves including a link between the website displayed on the internet browser discussed in regard to FIG. 4 and the television program being tuned by the master set top box 160 (FIG. 1D). In order to do this, the controller 230 (FIG. 2) first senses when a program change has occurred (step 450). Control signals, including channel up/down commands, come through the controller 230 (FIG. 2), therefore, the controller 230 (FIG. 2) has access to know when a program change has occurred.

Next, the controller retrieves the program information from an application like WatchTV running in memory (step 455). Using digital television, the incoming signal contains program information out-of-band signals or information interlaced into the picture frames. As mentioned above, the interactive program guide generator uses some of these same program information packets when it creates the program guide.

When the program information has been retrieved, the controller performs an internet search using the program information of the program being tuned (step 460). The controller then decides whether any of the websites are relevant websites (step 465). Most search engines define relevant websites in terms of those websites that use the search term from with the highest frequency. Here, the search engine might be instructed only to look for websites that use the search term with a specified frequency. The specified frequency could be a variable determined by the user, it could be fixed, or there may be no specified frequency, wherein the search engine would return any site using the term at least once. The controller then redirects the browser to open the most relevant site found (step 470).

Alternatively, the controller could perform a search on an internal lookup table in order to find a website associated with that channel or program (step 475). If there is a website listed in the lookup table as being associated with the program or channel (step 480), the controller will redirect the website to open that uniform resource locator (URL) (step 485). In a variation of this embodiment, the program guide database sent on the BFS signal may also contain a web link as a database entry associated with each program and/or each channel. Thus, when the program and/or channel are changed, the BFS signal can be transmitted along with the new signal, and the web browser can redirect on receipt of the BFS signal.

The search engine could employ any or all of the methods described above, and perform the methods in any order, such that a website associated with a program or channel can be located. In the case where there is no website found through the internet search, through the lookup table or on the BFS signal, the browser could continue to browse the current website or automatically redirect to a "home" website that has been defined by the user or is hardwired into the software.

One can imagine numerous alternatives to the above described embodiments. One such embodiment would be to open a website for advertisements associated with the channel being tuned. In another such embodiment, the program itself could send commands for the website browser to change to a particular website at various time intervals. A third embodiment could include switching the order of searches and attempt to tune the website associated with the lookup table prior to attempting an internet search for a website. A fourth embodiment could render the lookup table modifiable by the user to switch to a website of their own choice upon switching to a particular program. In a fifth embodiment, the program could be linked to more than one website requiring another browser to open (i.e. pop-up windows). And many more permutations to the above mentioned scheme would be readily apparent to one skilled in the art.

Figure 6:
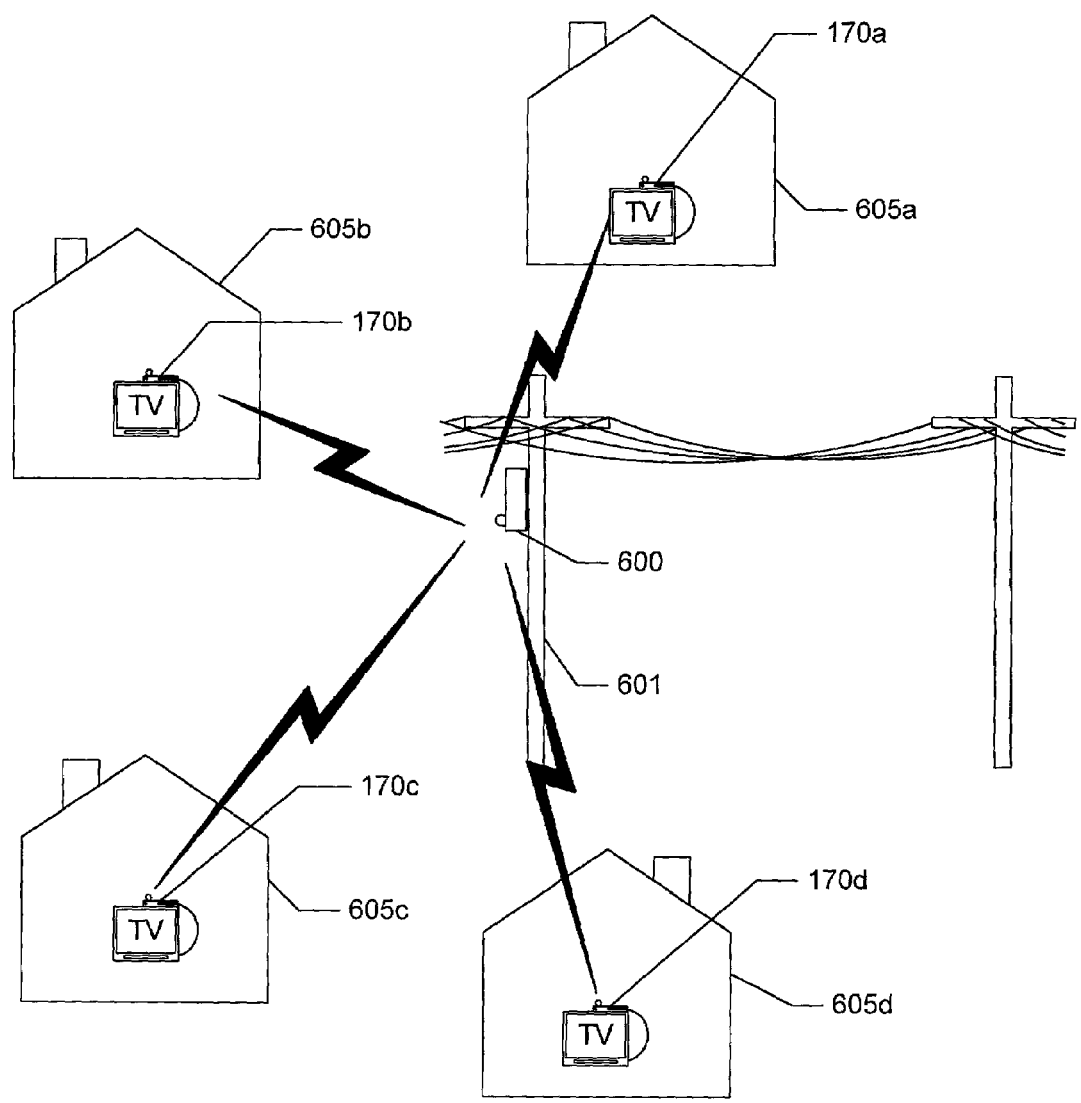
FIG. 6 is a block diagram illustrating an embodiment of the remote set top box as a wireless distribution hub.

Referring now to FIG. 6, another alternative embodiment of the distribution system is shown, wherein a set top box 600 acts as a master set top box that can be mounted, for example, on a telephone pole 601 outside the home. From there the master 600 can independently control the signals distributed to one or more house(s) 605(a-d) in the neighborhood in which it is mounted. Essentially, the master set top box 600 performs the function of a distribution hub. Each hub transmitting to one or more remote set top boxes 170(a-d) installed in the neighborhood homes 605(a-d).

The limited number of channels and bandwidth (approximately 10-11 Mbps across three channels for wireless ethernet, 10 Mbps on seven channels for Bluetooth 2.0, 54 Mbps over 8-12 channels for 802.11a, 22-24 Mbps on two-three channels for IEEE 802.11g, 10 Mbps on four channels for HomeRF 2.0, and 54 Mbps on 19 channels for HiperLAN/2) effectively puts a limit currently on the number of houses that can be served by one master set top box. A further limit is placed by the signal strength of each of the wireless systems, which can transmit up to about 100 feet. The remote set top box 170 then receives the signal from the master set top box 600. Each tuner contained by the master set top box 600 is independently tunable by the master controller at the request of each remote set top box 170. Thus a single master set top box 600 could deliver a personalized signal to each of the houses 605.

One skilled in the art will recognize that the system described above may also be adapted for intra-home use. The intra-home distribution system would include a master set top box 600 that receives the cable television signal through a coax cable connected to a distribution box outside the home. Here the distribution box is mounted in the attic, however a person having ordinary skill in the art should recognize that the master 600 could be placed anywhere inside or outside of the home. The only relevance of the location of the master 600 is that the remote set top boxes 170(a-d) should be able to pick up the signal being broadcast by the master 600. The aforementioned programs and software, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The flowcharts of FIGS. 2A, 3A, and 5 show the architecture, functionality, and operation of a possible implementation of the devices described herein. In this regard, each block represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession in the figures may in fact be executed substantially concurrently or the blocks may sometimes be executed in the reverse order, depending upon the functionality involved.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A master set top terminal (STT), comprising:
   a first tuner tuning a television signal from a received multiplexed signal, to a first tuned television signal, wherein the multiplexed signal is received from a headend service provider;
   a second tuner tuning the television signal from the received multiplexed signal, into second tuned television signal;
   a video encoder supporting a plurality of encoding formats and coupled to the first tuner and receiving the first tuned television signal and digitally encoding the first tuned television signal having one of the encoding formats into an encoded signal having another one of the encoding formats, and further operating in accordance with a parameter describing quality of the encoded signal, and further automatically changing the parameter upon the master STT becoming ready to compress the television signal from the multiplexed signal received from the headend service provider, such that the quality of the encoded signal is improved while achieving a low latency, wherein the parameter change is responsive to a change in capability of the video encoder to encode at the improved quality;
   a transmitter coupled to the video encoder and transmitting the encoded signal to a remote STT to be displayed on a first viewing device;
   a receiver receiving a control signal from the remote STT corresponding to a user input;
   a controller coupled to the receiver for accepting the control signal from the receiver and for instructing the first tuner to tune to another tuned television signal and for instructing the video encoder to encode the another tuned television signal into a changed encoded television signal in response thereto, such that the transmitter transmits the changed encoded television signal to the remote STT for display on the first viewing device; and
   a Radio Frequency (RF) driver coupled to the second tuner, the RF driver for facilitating transmission of the second tuned television signal independently to a second viewing device, the second viewing device being different than the first viewing device.

2. The master STT as defined in claim 1, wherein the changed encoded television signal is displayed at the first viewing device within two seconds from the remote STT receiving the user input.

3. The master STT as defined in claim 2, wherein the changed encoded television signal is displayed at the first viewing device within a half second from the remote STT receiving the user input.

4. The master STT as defined in claim 3, wherein the transmitter and receiver operate according to a wireline standard selected from the group consisting of HomePlug and HomePNA.

5. The master STT as defined in claim 2, wherein the transmitter and receiver operate according to a wireless standard selected from the group consisting of IEEE 802.11a, IEEE 802.11b, IEEE 802.11g. Bluetooth 2.0, HomeRF 2.0, HiperLAN/2, and Ultra-Wideband standards.

6. The master STT as defined in claim 5, wherein the video encoder uses a form of digital compression.

7. The master STT as defined in claim 6, wherein the video encoder is selected from the group consisting of Microsoft NetMeeting, Windows Media Player, and Real Player.

8. The master STT as defined in claim 6, wherein the low latency between the reception of the control signal and the transmission of the changed television signal is achieved by immediately encoding and transmitting a lower quality video signal.

9. The master STT as defined in claim 8, wherein a higher quality video signal is transmitted after a period during which the lower quality video signal is transmitted.

10. The master STT as defined in claim 9, wherein the period of lower quality video transmission allows the higher quality video signal to be encoded for transmission.

11. The master STT as defined in claim 9, wherein the encoding format is at least one of H.263, H.323, H.324, MPEG-1, low bit-rate MPEG-2, MPEG-2 or MPEG-4.

12. The master STT as defined in claim 11, wherein the encoding format is low bit-rate MPEG-2 and at least one of H.323, H.324, MPEG-1, MPEG-2 or MPEG-4.

13. The master STT as defined in claim 11, wherein the encoding format is H.263 and at least one of H.323, H.324, MPEG-1, MPEG-2 or MPEG-4.

14. The master STT as defined in claim 11, wherein the transmitted signal includes an encoding parameter enabling the remote STT to decode the transmitted signal using multiple decoding algorithms according to the encoding parameters.

15. The master STT as defined in claim 1, wherein the received multiplexed signal further comprises a program information component, and the master STT further comprises a program guide generator, receiving the program information from the received multiplexed signal and generating a program guide therefrom that can be transmitted by the transmitter upon a user request for the program guide at the remote STT.

16. The master STT as defined in claim 1, wherein the master SIT further comprises an internet connection, and the transmitter is capable of transmitting content derived from the internet connection to the remote STT.

17. The master STT of claim 1, wherein the change in capability of the video encoder to encode at the improved quality relates to buffering of the first tuned television signal.

18. The master STT of claim 1, wherein the capability of the video encoder to encode at the improved quality relates to a rate of encoding.

19. A method implemented in a master set-top terminal (STT), the method comprising:
   tuning, at a first tuner, a television signal from a received multiplexed signal, into a first tuned television signal;
   tuning, at a second tuner, the television signal from the received multiplexed signal, into a second tuned television signal;
   receiving the first tuned television signal at a video encoder supporting a plurality of encoding formats;
   digitally encoding the first tuned television signal having one of the plurality of encoding formats into an encoded signal having another one of the plurality of encoding formats, in accordance with a parameter describing quality of the encoded signal;

automatically changing the parameter upon the master STT becoming ready to compress the television signal from the multiplexed signal received from the headend service provider to improve the quality of the encoded signal while achieving a low latency, responsive to a change in capability to encode at the improved quality;

transmitting the encoded signal to a remote STT to be displayed on a first viewing device;

receiving a control signal corresponding to a user input at the remote STT;

responsive to the received control signal, instructing the first tuner to tune to another tuned television signal such that an encoding of the another tuned television signal is transmitted to the remote STT for display on the first viewing device; and facilitating transmission of the second tuned television signal independently to a second viewing device, the second viewing device being different than the first viewing device.

20. The method of claim 19, further comprising:
transmitting a decode parameter indicative of the changed parameter.

21. The method of claim 20, wherein the decode parameter is conveyed in a packet header.

22. The method of claim 20, wherein the decode parameter is conveyed in an out-of-band data packet.

23. The method of claim 20, further comprising:
transmitting a predetermined bit pattern before the transmitting the decode parameter.

24. The method of claim 19, further comprising:
transmitting the encoded signal simultaneously with the first tuned television signal having one of the plurality of encoding formats.

25. The method of claim 19, wherein the one of the encoding formats and the another one of the plurality of encoding formats differ in bit rate.

26. The method of claim 19, wherein the one of the plurality of encoding formats and the another one of the encoding formats conform to a common standard but differ in bit rate.

27. The method of claim 19, wherein the encoding operates in accordance with a parameter describing quality of the encoded signal, the method further comprising:
changing the parameter after a time period such that the quality of the encoded signal is improved.

28. The method of claim 19, wherein the encoding operates in accordance with a parameter describing quality of the encoded signal, the method further comprising:
maintaining the parameter over time such that the quality of the encoded signal is maintained.

29. The method of claim 19, wherein the television signal is an analog modulated signal.

30. The method of claim 19, wherein the television signal is a digitally modulated signal.

31. The method of claim 19, wherein the transmitting and the receiving operate according to a wireline standard selected from the group consisting of HomePlug and HomePNA.

32. The method of claim 19, wherein the transmitting and the receiving operate according to a wireless standard selected from the group consisting of IEEE 802.11a, IEEE 802.11b, IEEE 802.11g, Bluetooth 2.0, HomeRF 2.0, HiperLAN/2, and Ultra-Wideband standards.

33. The method of claim 19, wherein the plurality of encoding formats includes at least one of H.263, H.323, H.324, MPEG-1, low bit-rate MPEG-2, MPEG-2 or MPEG-4.

34. The method of claim 19, wherein the plurality of encoding formats includes low bit-rate MPEG-2 and at least one of H.323, H.324, MPEG-1, MPEG-2 or MPEG-4.

35. The method of claim 19, wherein the plurality of encoding formats includes H.263 and at least one of H.323, H.324; , MPEG-1, MPEG-2 or MPEG-4.

36. The method of claim 19, wherein the change in capability to encode at the improved quality relates to buffering of the first tuned television signal.

37. The method of claim 19, wherein the capability to encode at the improved quality relates to a rate of encoding.

38. A computer readable medium comprising a memory device encoded with computer executable instructions being executed by a processor in a master set-top terminal (STT) which will cause the master STT to:

tune, at a first tuner, a television signal from a received multiplexed signal, into a first tuned television signal, wherein the received multiplexed signal is received from a headend service provider;

tune, at a second tuner, the television signal from the received multiplexed signal, into a second tuned television signal;

receive the first tuned television signal at a video encoder supporting a plurality of encoding formats;

digitally encode the first tuned television signal having one of the plurality of encoding formats into an encoded signal having another one of the plurality of encoding formats, in accordance with a parameter describing quality of the encoded signal;

automatically change the parameter upon the master STT becoming ready to compress the television signal from the received multiplexed signal received from the headend service provider, such that the quality of the encoded signal is improved while achieving a low latency, responsive to a change in capability to encode at the improved quality;

transmit the encoded signal to a remote STT to he displayed on a first viewing device;

receive a control signal corresponding to a user input at the remote STT;

responsive to the received control signal, instruct the first tuner to tune to another tuned television signal such that an encoding of the another tuned television signal is transmitted to the remote STT for display on the first viewing device; and facilitate transmission of the second tuned television signal independently to a second viewing device, the second viewing device being different that the first viewing device.

39. The computer readable medium of claim 38, the computer readable medium further encoded with executable instructions operable to:
transmit a decode parameter indicative of the changed parameter.

40. The computer readable medium of claim 38, wherein the decode parameter is conveyed in a packet header.

41. The computer readable medium of claim 38, wherein the decode parameter is conveyed in an out-of-band data packet.

42. The computer readable medium of claim 38, the computer readable medium further encoded with executable instructions operable to:
transmit a predetermined bit pattern before the transmitting the decode parameter.

43. The computer readable medium of claim 38, the computer readable medium further encoded with executable instructions operable to:

transmit the encoded signal simultaneously with the first tuned television signal having one of the plurality of encoding formats.

44. The computer readable medium of claim 38, wherein the one of the plurality of encoding formats and the another one of the encoding formats differ in bit rate.

45. The computer readable medium of claim 38, wherein the one of the plurality of encoding formats and the another one of the encoding formats conform to a common standard but differ in bit rate.

46. The computer readable medium of claim 38, wherein the encoding operates in accordance with a parameter describing quality of the encoded signal, the computer readable medium further encoded with executable instructions operable to:
 changing the parameter after a time period such that the quality of the encoded signal is improved.

47. The computer readable medium of claim 38, wherein the encoding operates in accordance with a parameter describing quality of the encoded signal, the computer readable medium further encoded with executable instructions operable to:
 maintaining the parameter over time such that the quality of the encoded signal is maintained.

48. The computer readable medium of claim 38, wherein the television signal is an analog modulated signal.

49. The computer readable medium of claim 38, wherein the television signal is a digitally modulated signal.

50. The computer readable medium of claim 38, wherein the transmitting and the receiving operate according to a wireline standard selected from the group consisting of HomePlug and HomePNA.

51. The computer readable medium of claim 38, wherein the transmitting and the receiving operate according to a wireless standard selected from the group consisting of IEEE 802.11a, IEEE 802.11b, IEEE 802.11g. Bluetooth 2.0, HomeRF 2.0, HiperLAN/2, and Ultra-Wideband standards.

52. The computer readable medium of claim 38, wherein the plurality of encoding formats includes at least one of H.263, H.323, H.324, MPEG-1, low bit-rate MPEG-2, MPEG-2 or MPEG-4.

53. The computer readable medium of claim 38, wherein the plurality of encoding formats includes low bit-rate MPEG-2 and at least one of H.323, H.324, MPEG-1, MPEG-2 or MPEG-4.

54. The computer readable medium of claim 38, wherein the plurality of encoding formats includes H.263 and at least one of H.323, H324, MPEG-1, MPEG-2 or MPEG-4.

55. The computer readable medium of claim 38, wherein the change in capability to encode at the improved quality relates to buffering of the first tuned television signal.

56. The computer readable medium of claim 38, wherein the capability to encode at the improved quality relates to a rate of encoding.

* * * * *